United States Patent
Porwal et al.

(10) Patent No.: US 11,073,303 B2
(45) Date of Patent: Jul. 27, 2021

(54) COMBUSTION TUBE ASSEMBLY OF A WATER HEATER

(71) Applicant: Rheem Manufacturing Company, Atlanta, GA (US)

(72) Inventors: Piyush Porwal, Montgomery, AL (US); Ashwin Rao, Montgomery, AL (US); Jason Hall, Prattville, AL (US); Jozef Boros, Atlanta, GA (US)

(73) Assignee: Rheem Manufacturing Company, Atlanta, GA (US)

( * ) Notice: Subject to any disclaimer, the term of this patent is extended or adjusted under 35 U.S.C. 154(b) by 189 days.

(21) Appl. No.: 16/218,322

(22) Filed: Dec. 12, 2018

(65) Prior Publication Data

US 2020/0191438 A1 Jun. 18, 2020

(51) Int. Cl.
| | |
|---|---|
| *F24H 9/18* | (2006.01) |
| *F24H 1/14* | (2006.01) |
| *F23C 3/00* | (2006.01) |
| *F24H 1/20* | (2006.01) |
| F23B 80/04 | (2006.01) |
| F23M 20/00 | (2014.01) |

(52) U.S. Cl.
CPC ............ *F24H 9/1836* (2013.01); *F23C 3/002* (2013.01); *F24H 1/145* (2013.01); *F24H 1/205* (2013.01); *F23B 80/04* (2013.01); *F23M 20/00* (2015.01)

(58) Field of Classification Search
CPC ........ F24H 1/0027; F24H 1/145; F24H 1/186; F24H 1/205; F24H 1/206; F24H 1/208; F24H 1/43; F24H 8/00; F24H 9/0026; F24H 9/0031; F24H 9/1836; F22B 37/06; F22B 9/02; F22B 9/04; F22B 13/005; F22B 21/348
USPC ... 122/17.1, 18.1, 18.3, 44.2, 114, 118, 134, 122/48, 155.1, 155.2
See application file for complete search history.

(56) References Cited

U.S. PATENT DOCUMENTS

| | | | | | |
|---|---|---|---|---|---|
| 1,784,652 | A | * | 12/1930 | Badger | F24H 1/125 122/156 |
| 4,380,215 | A | * | 4/1983 | Mendelson | F24H 9/0026 122/155.2 |
| 5,063,632 | A | * | 11/1991 | Clark | F28G 1/166 122/390 |
| 6,036,480 | A | * | 3/2000 | Hughes | F23D 14/24 122/249 |

(Continued)

*Primary Examiner* — Vivek K Shirsat
*Assistant Examiner* — Ko-Wei Lin
(74) *Attorney, Agent, or Firm* — Troutman Pepper Hamilton Sanders LLP

(57) ABSTRACT

A combustion tube assembly of a water heater includes a combustion tube having an open end, a closed end, and an outflow opening located between the open end and the closed end. A cavity of the combustion tube provides a chamber for a combustion of a water heater fuel that produces an exhaust gas that flows down toward the closed end. The combustion tube assembly further includes a diverter structure positioned inside the combustion tube to divert the exhaust gas such that the exhaust gas flows toward the closed end on a first side of the diverter structure and flows from the first side of the diverter structure to the second side of the diverter structure through a flow opening proximal to the closed end. The outflow opening provides an outlet for the exhaust gas that flows to the second side of the diverter structure to exit the combustion tube.

17 Claims, 15 Drawing Sheets

(56) References Cited

U.S. PATENT DOCUMENTS 6,200,428 B1 * 3/2001 VanKouwenberg .......................... B01D 1/0058
110/238

* cited by examiner

COMBUSTION TUBE ASSEMBLY OF A WATER HEATER

CROSS REFERENCE TO RELATED APPLICATIONS

The present application is related to U.S. patent application Ser. No. 16/218,320, filed 12 Dec. 2018, the entire content of which is incorporated herein by reference.

TECHNICAL FIELD

The present disclosure relates generally to water heaters, and more particularly to a combustion tube assembly and a heat exchanger assembly for water heaters.

BACKGROUND

Typical down-fired water heaters use fuels, such as natural gas, propane or oil, to heat water contained in a water tank of such water heaters. Typically, a combustion chamber and a heat exchanger are positioned in a water tank of the water heater. The heat exchanger may be fluidly connected to the combustion chamber such that an exhaust gas generated in the combustion chamber flows down to an inlet of the heat exchanger and flows through the heat exchanger to heat the water in the water tank. The hot exhaust gas typically flows down unobstructed through the combustion chamber to the inlet of the heat exchanger. The exhaust gas that enters the heat exchanger from the combustion chamber cools down as it flows through the heat exchanger. Although some heat exchange may occur from hot exhaust gas to the water in the tank through the combustion chamber, the heat exchanger serves as the primary component for the exchange of heat from the hot exhaust gas to the water. The flow of the hot exhaust gas is mostly a laminar flow within the combustion chamber, which limits the transfer of heat from the exhaust gas through combustion chamber. In some application, increasing the transfer of heat from the exhaust gas to the water contained in the tank through the combustion chamber may result in increased overall heat transfer to the water. Thus, a solution that enables increased transfer of heat from the exhaust gas to the water in the water tank through the combustion chamber may be desirable.

SUMMARY

The present disclosure relates generally to water heaters, and more particularly to a combustion tube assembly and a heat exchanger assembly for water heaters. In some example embodiments, a combustion tube assembly of a water heater includes a combustion tube having an open end, a closed end, and an outflow opening located between the open end and the closed end. A cavity of the combustion tube provides a chamber for a combustion of a water heater fuel that produces an exhaust gas that flows down toward the closed end. The combustion tube assembly further includes a diverter structure positioned inside the combustion tube to divert the exhaust gas such that the exhaust gas flows toward the closed end on a first side of the diverter structure and flows from the first side of the diverter structure to a second side of the diverter structure through a flow opening proximal to the closed end. The outflow opening provides an outlet for the exhaust gas that flows to the second side of the diverter structure to exit the combustion tube.

In another example embodiment, a heat exchanger assembly of a water heater includes a combustion tube having an open end, a closed end, and an outflow opening located between the open end and the closed end, where a cavity of the combustion tube provides a chamber for a combustion of a water heater fuel that produces an exhaust gas that flows down toward the closed end. The heat exchanger assembly further includes a diverter structure positioned inside the combustion tube to divert the exhaust gas such that the exhaust gas flows toward the closed end on a first side of the diverter structure and such that the exhaust gas flows from the first side of the diverter structure to a second side of the diverter structure through a flow opening proximal to the closed end. The heat exchanger assembly also includes a hollow coil attached to the combustion tube, where the outflow opening provides an outlet for the exhaust gas that flows to the second side of the diverter structure to exit the combustion tube into the hollow coil.

In another example embodiment, a water heater includes a water tank and a combustion system positioned at a top end of the water heater. The water heater further includes a heat exchanger assembly positioned inside the water tank. The heat exchanger assembly includes a combustion tube having an open end, a closed end, and an outflow opening located between the open end and the closed end, where a cavity of the combustion tube provides a chamber for a combustion of a water heater fuel that produces an exhaust gas that flows down toward the closed end. The heat exchanger assembly further includes a diverter structure positioned inside the combustion tube to divert the exhaust gas such that the exhaust gas flows toward the closed end on a first side of the diverter structure and such that the exhaust gas flows from the first side of the diverter structure to a second side of the diverter structure through a flow opening proximal to the closed end. The heat exchanger assembly also includes a hollow coil attached to the combustion tube, where the outflow opening provides an outlet for the exhaust gas that flows to the second side of the diverter structure to exit the combustion tube into the hollow coil.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
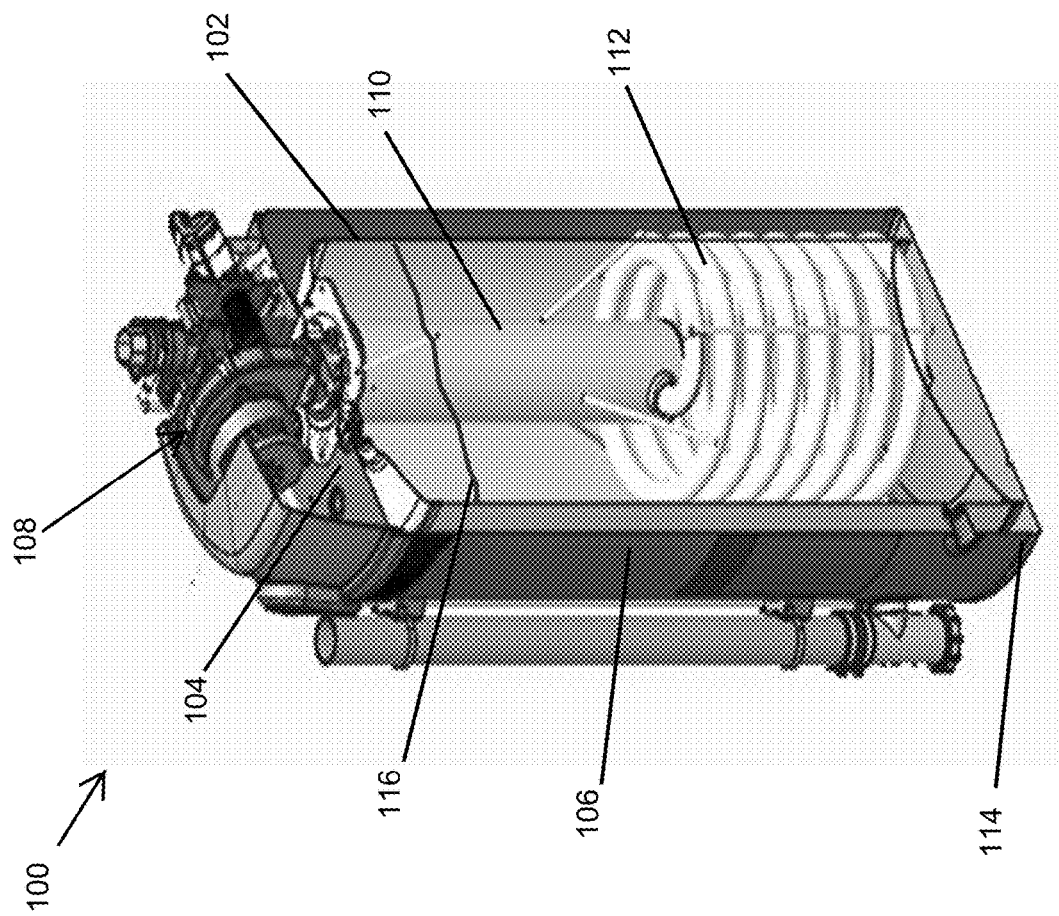
FIG. 1 illustrates a cross-sectional view of a water heater according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals that are used in different drawings designate like or corresponding, but not necessarily identical elements.

DETAILED DESCRIPTION OF EXAMPLE EMBODIMENTS

In the following paragraphs, example embodiments will be described in further detail with reference to the figures. In the description, well-known components, methods, and/or processing techniques are omitted or briefly described. Furthermore, reference to various feature(s) of the embodiments is not to suggest that all embodiments must include the referenced feature(s).

Turning now to the figures, particular example embodiments are described. FIG. 1 illustrates a cross-sectional view of a water heater 100 according to an example embodiment. In some example embodiments, the water heater 100 includes water tank 102, a top cover assembly 104, and a shell 106 positioned on the outside of the water tank 102. The water heater 100 also includes a combustion system 108 at the top end of the water heater 100. For example, the combustion system 108 may include a down-fired burner, where a hot exhaust gas produced by the combustion system 108 is pushed downward in a combustion tube assembly 110 by a blower of the combustion system 108. The hot exhaust gas that flows down in the combustion tube assembly 110 enters a heat exchanger 112 that transfers heat from the hot exhaust gas to water 116 that is contained in the water tank 102.

In some example embodiments, the water heater 100 includes a water inlet that may be disposed, for example, closer to a bottom end 114 of the water heater 100. The water heater 100 may also include a top water outlet through the top cover assembly 104. In some alternative embodiments, the water heater 100 may have a water inlet and a water outlet on the same side or end (e.g., top end) of the water heater 100 or different sides or ends of the water heater 100. In some example embodiments, the water heater may also have other inlets or outlets (e.g., exhaust gas and condensate outlets) as can be readily understood by those of ordinary skill in the art with the benefit of this disclosure.

In some example embodiments, the combustion tube assembly 110 includes a spring as explained below with respect to FIGS. 2-5. The spring may cause turbulence in the hot exhaust gas flowing in the combustion tube assembly 110. The turbulence in the hot exhaust gas may result in an increased transfer of heat from the hot exhaust gas to the water 116 in the water tank 102 through the combustion tube assembly 110 by reducing the more laminar flow of the hot exhaust gas in the combustion tube assembly 110.

In some example embodiments, the combustion tube assembly 110 includes a diverter structure that diverts the hot combustion gas as explained below with respect to FIGS. 6-14. The diverter structure increases the number of passes that the hot exhaust gas makes in a portion of the combustion tube assembly 110 before entering the heat exchanger 112. The multiple passes of the hot exhaust gas may result in an increased transfer of heat from the hot exhaust gas to the water 116 in the water tank 102 through the combustion tube assembly 110. The diverter structure may also cause turbulence in the hot exhaust gas flowing in the combustion tube assembly 110, which also results in an increased transfer of heat from the hot exhaust gas to the water 116 in the water tank 102 through the combustion tube assembly 110 by reducing the more laminar flow of the hot exhaust gas.

During operations of the water heater 100, unheated water enters the water tank 102 through a water inlet of the water tank 102, and gas fuel may be ignited by the combustion system 108, for example, inside the combustion tube assembly 110, where the resulting hot exhaust gas is pushed down the combustion tube assembly 110, for example, by a blower of the combustion system 108. The unheated water that enters the water tank 102 is heated by hot exhaust gas flowing in the combustion tube assembly 110 and the heat exchanger 112. To illustrate, some of the heat from the hot exhaust gas is transferred to the water in the water tank 102 through the combustion tube assembly 110, and some of the heat from the hot exhaust gas is transferred through the heat exchanger 112 to the water in the water tank 102. The resulting heated water exits the water tank 102 through the water outlet in the water tank 102 and the water heater 100. The hot exhaust gas that enters the heat exchanger 112 from the combustion tube assembly 110 cools down after flowing through the heater exchanger 112 and generally exits the heat exchanger 112 at a much lower temperature and may exit the water heater 100 through a hot gas outlet, for example, at the bottom of the water heater 100. A condensate resulting from cooling of the exhaust gas may also be directed out of the water heater 110 through a condensate outlet.

By providing a spring or another diverter structure in the combustion tube assembly 110, the combustion tube assembly 110 enables an increased transfer of heat from the exhaust gas to the water in the water tank 102 through the combustion tube 110. By increasing heat transfer to the water before the exhaust gas enters the heat exchanger 112 from the combustion tube assembly 110, the overall water heating efficiency of the water heater 100 may be increased compared to a down-fired water heater that does not have a spring or another diverter structure inside a combustion tube of the water heater.

In some alternative embodiments, the water heater 100 and/or one or more components of the water heater 100 may have a different shape than shown without departing from the scope of this disclosure. In some alternative embodiments, the combustion system 108 may be at a different location than shown at the top end of the water heater 100 without departing from the scope of this disclosure. Although a particular combustion system 108 is shown in FIG. 1, in some alternative embodiments, the water heater 100 may include a different type of combustion system that is located at the top end of the water heater 100 without departing from the scope of this disclosure. In some example embodiments, the heat exchanger 112 may be attached to the combustion tube assembly 110 by one or more means as can be contemplated by those of ordinary skill in the art with the benefit of this disclosure. The different components of the water heater 100 may be made from suitable material, such as steel, etc., as can be contemplated by those of ordinary skill in the art with the benefit of this disclosure.

Figure 2:
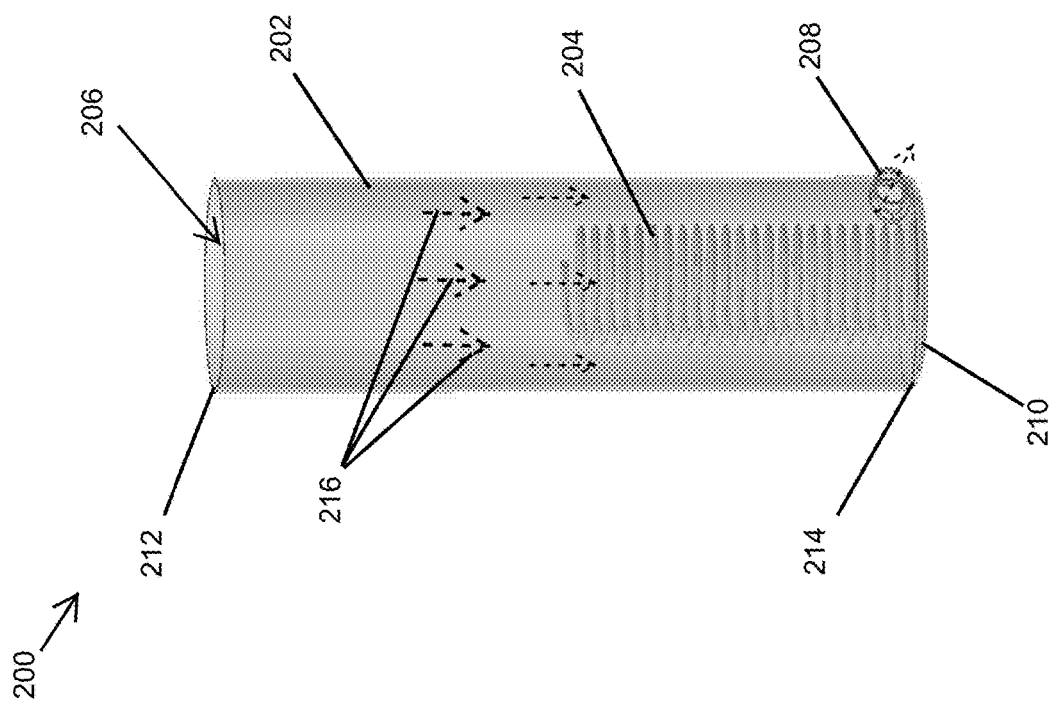
FIG. 2 illustrates a side view of a combustion tube assembly of a water heater including a combustion tube shown as a transparent structure according to an example embodiment.

FIG. 2 illustrates a side view of a combustion tube assembly 200 including a combustion tube 202 shown as a transparent structure according to an example embodiment. Referring to FIGS. 1 and 2, in some example embodiments, the combustion tube assembly 200 of FIG. 2 may correspond to the combustion tube assembly 110 shown in FIG. 1 or may be used in the water heater 100 in place of the combustion tube assembly 110.

In some example embodiments, the combustion tube assembly 200 includes a combustion tube 202 and a spring 204 that is positioned in a cavity 206 of the combustion tube 202. The combustion tube 202 has an open end 212, a closed end 214, and an outflow opening 208. The outflow opening 208 is located between the open end 212 and the closed end 214. The portion of the cavity 206 of the combustion tube 202 proximal to the open end 212 provides a chamber for combustion of a water heater fuel, such as propane, etc. The outflow opening 208 provides an outlet for an exhaust gas resulting from the combustion of the water heater fuel to exit the combustion tube 202.

In some example embodiments, the spring 204 is positioned inside the combustion tube at the closed end 214 of the combustion tube 202. For example, the combustion tube 202 may be closed at the closed end by a cover structure 210, and the spring 204 may be attached to the cover structure 210. To illustrate, the spring 204 may be attached to the cover structure 210 before the cover structure 210 is attached to the combustion tube 202. After the spring 204 is attached to the cover structure 210, the cover structure 210 may be attached to the combustion tube 202 using methods such as welding or other methods that can be contemplated by those of ordinary skill in the art with the benefit of this disclosure. For example, the combustion tube 202 may be sealed at the closed end 214 by the cover structure 210 such that exhaust gas does not exit the combustion tube 202 through the closed end 214.

As illustrated in FIG. 2, in some example embodiments, the spring 204 may be a helical spring. The spring 204 may be attached to the cover structure 210 by a fastener or other means such as welding, etc. For example, a winding of the spring 204 at the bottom end of the spring 204 may be fastened or welded to the cover structure 210. The spring 204 may be positioned centrally in the combustion tube 202, which may be a cylindrical tube as shown in FIG. 2. For example, a portion of the combustion tube 202 may be annularly positioned around the spring 204 such that the inner walls of the combustion tube 202 are spaced from the spring 204.

In some example embodiments, when the combustion tube assembly 200 is installed in a water heater, such as the water heater 100 of FIG. 1, the hot exhaust gas resulting from the combustion of the water heater fuel proximal to the open end 212 of the combustion tube 202 flows down toward the closed end 214 and exits the combustion tube 202 through the outflow opening 208. The flow direction of the hot exhaust gas in the combustion tube 202 is shown by arrows 216, where the blower of the combustion system 108 of the water heater 100 pushes the hot exhaust gas downwardly away from the open end 212 toward the closed end 214.

In some example embodiments, as the hot exhaust gas flows down toward the closed end 214, some of the hot exhaust gas flows in the annular space between the spring 204 and the combustion tube 202, and some of the hot exhaust gas flows through the center of the spring 204. The redirection of some of the hot exhaust gas among spaces that are outside and inside the spring 204 disturbs the more laminar flow of the hot exhaust gas, which results in improved transfer of heat from the hot exhaust gas to the combustion tube 202. The encounter between the windings of the spring 204 and the hot exhaust gas flowing down toward the closed end 214 also causes turbulence in the hot exhaust gas, which also results in improved transfer of heat from the hot exhaust gas to the combustion tube 202 by disrupting the more laminar flow of the hot exhaust gas reaching the spring 204.

In some example embodiments, the outflow opening 208 may be located proximal to the closed end 214. The hot exhaust gas exits the combustion tube 202 through the outflow opening 208 after having transferred some of its heat to the combustion tube 202.

The combustion tube assembly 200 results in a more efficient heating of the water contained in a water tank of a water heater, such as the water heater 100, compared to a combustion tube that does not have the spring 204 positioned therein. The disturbances of the hot exhaust gas flowing down through and around the spring 204 result in an increased transfer of heat from the hot exhaust gas to the combustion tube 202, thereby increasing the transfer of heat from the hot exhaust gas to the water in the water tank, such as the water tank 102, through the combustion tube 202.

In some example embodiments, the combustion tube 202 and the spring 204 may be made from a material that is suitable for use in a water heater as can be readily understood by those of ordinary skill in the art with the benefit of this disclosure. For example, the combustion tube may be made from steel. As another example, the spring 204 may be made from stainless steel or Inconel in a manner known by those of ordinary skill in the art with the benefit of this disclosure. In some example embodiments, the outflow opening 208 may extend out less or may not extend out as shown in FIG. 2 and may, for example, be flush with the combustion tube 202.

In some alternative embodiments, the spring 204 may be shorter or longer relative to the combustion tube 202 than shown in FIG. 2. In some alternative embodiments, the spring 204 may have a smaller or larger diameter than shown in FIG. 2. In some alternative embodiments, the spring 204 may have a smaller or larger pitch than shown in FIG. 2 without departing from the scope of this disclosure. In some alternative embodiments, the outflow opening 208 may be at a different location than shown without departing from the scope of this disclosure. In some alternative embodiments, the combustion tube 202 and/or the spring 204 may have a different shape than shown without departing from the scope of this disclosure.

Figure 3:
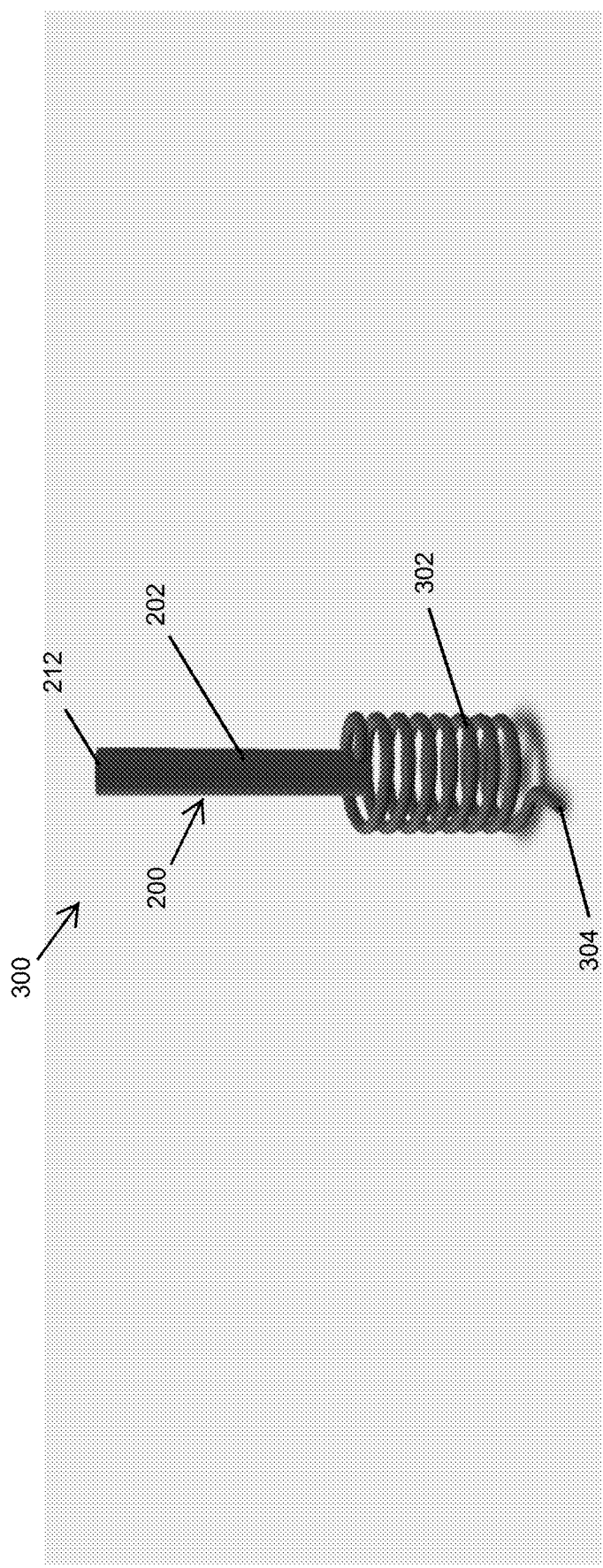
FIG. 3 illustrates a side view of a heat exchanger assembly including the combustion tube assembly of FIG. 2 according to an example embodiment.

FIG. 3 illustrates a side view of a heat exchanger assembly 300 including the combustion tube assembly 200 of FIG. 2 according to an example embodiment. In some example embodiments, the heat exchanger assembly 300 of FIG. 3 may correspond to or may be used in place of the combustion tube assembly 110 and the heat exchanger 112 shown in FIG. 1. Referring to FIGS. 1-3, the heat exchanger assembly 300 includes the combustion tube assembly 200 and the heat exchanger 302. The heat exchanger 302 is attached to the combustion tube 202 at the outflow opening 208 of the combustion tube 202. For example, the heat exchanger 302 may be welded or attached by other means as can be readily contemplated by those of ordinary skill in the art with the benefit of this disclosure.

In some example embodiments, when the heat exchanger assembly 300 is installed in a water heater, such as the water heater 100, more heat is transferred from the hot exhaust gas to the water through the combustion tube 202 compared to the amount of heat transferred to the water through a typical combustion tube that does not include the spring 204. The hot exhaust gas that flows in the combustion tube 202 enters the heat exchanger 302 from the combustion tube 202 through the outflow opening 208 after transferring some of its heat to the water through the combustion tube 202.

The exhaust gas exiting the combustion tube 202 enters the heat exchanger 302 through the outflow opening 208 and flows through the heat exchanger 302. To illustrate, the heat exchanger 302 may be a hollow coil that has an inflow opening that is aligned with the outflow opening 208. The exhaust gas in the heat exchanger 302 transfers heat to the water in the water tank through the heat exchanger 302 as the exhaust gas flows through the heat exchanger 302. The exhaust gas leaves the heat exchanger 302 through an exhaust outlet 304. Because the exhaust gas transfers heat to the water through the heat exchanger 302 as it flows through the heat exchanger 302, the exhaust gas has a lower temperature at the exhaust outlet 304 than at the outflow opening 208.

By increasing the transfer of heat through the combustion tube 202 of the combustion tube assembly 200, the heat transfer efficiency of the heat exchanger assembly 300 is increased. The combustion tube assembly 200 and the heat exchanger assembly 300 allow more of the heat produced in the combustion tube 202 to be utilized by a water heater such as the water heater 100.

In some example embodiments, the heat exchanger 302 may be made from a suitable material as can be readily contemplated by those of ordinary skill in the art with the benefit of this disclosure. For example, the heat exchanger 302 may be made from steel or another material using methods, such as bending, etc., known by those of ordinary skill in the art with the benefit of this disclosure.

In some alternative embodiments, the heat exchanger 302 may have fewer windings than shown without departing from the scope of this disclosure. In some alternative embodiments, the heat exchanger 302 may have a different shape than shown without departing from the scope of this disclosure. In some alternative embodiments, the heat exchanger 302 may be attached to the combustion tube 202 at a different location than shown without departing from the scope of this disclosure. In some alternative embodiments, the relative heights of the combustion tube 202 and the heat exchanger 302 may be different than shown without departing from the scope of this disclosure.

Figure 4:
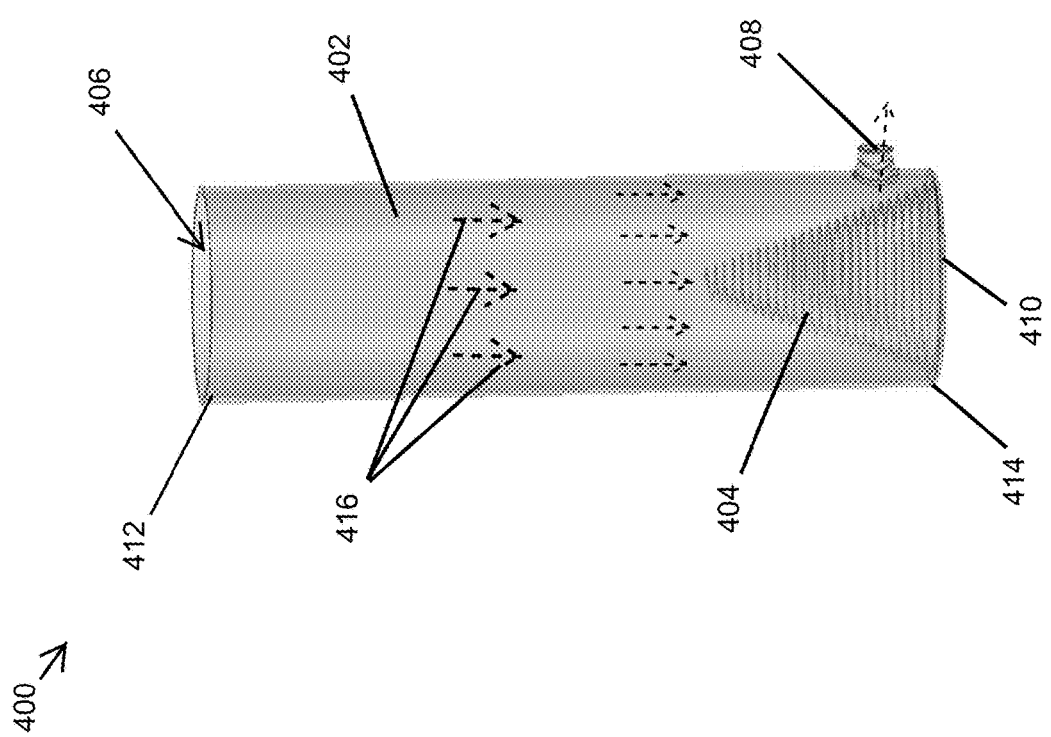
FIG. 4 illustrates a side view of a combustion tube assembly of a water heater including a combustion tube shown as a transparent structure according to another example embodiment.

FIG. 4 illustrates a side view of a combustion tube assembly 400 including a combustion tube 402 shown as a transparent structure according to another example embodiment. In some example embodiments, the combustion tube assembly 400 of FIG. 4 may correspond to the combustion tube assembly 110 shown in FIG. 1 or may be used in the water heater 100 in place of the combustion tube assembly 110.

In some example embodiments, the combustion tube assembly 400 includes a combustion tube 402 and a spring 404 that is positioned in a cavity 406 of the combustion tube 402. The combustion tube 402 has an open end 412, a closed end 414, and an outflow opening 408. The outflow opening 408 is located between the open end 412 and the closed end 414. The portion of the cavity 406 of the combustion tube 402 proximal to the open end 412 provides a chamber for combustion of a water heater fuel, such as propane, etc. The outflow opening 408 provides an outlet for an exhaust gas resulting from the combustion of the water heater fuel to exit the combustion tube 402.

In some example embodiments, the spring 404 is positioned inside the combustion tube at the closed end 414 of the combustion tube 402. For example, the combustion tube 402 may be closed at the closed end by a cover structure 410, and the spring 404 may be attached to the cover structure 410. To illustrate, the spring 404 may be attached to the cover structure 410 before the cover structure 410 is attached to the combustion tube 402. After the spring 404 is attached to the cover structure 410, the cover structure 410 may be attached to the combustion tube 402 using methods such as welding or other methods that can be contemplated by those of ordinary skill in the art with the benefit of this disclosure. For example, the combustion tube 402 may be sealed at the closed end 414 by the cover structure 410 such that exhaust gas does not exit the combustion tube 402 through the closed end 414.

In some example embodiments, the combustion tube 402 may be substantially similar to the combustion tube 202 of FIG. 2 in dimensions, material, etc. In contrast to the helical shape of the spring 204 of FIG. 2, in some example embodiments, the spring 404 may be a conical spring. The spring 404 may be attached to the cover structure 410 by a fastener or other means such as welding, etc. For example, the larger diameter end of the spring 404 at the bottom end of the spring 404 may be fastened or welded to the cover structure 410, and the opposite smaller diameter end of the spring 404 may be unattached. The spring 404 may be positioned centrally in the combustion tube 402, which may be a cylindrical tube as shown in FIG. 4. For example, a portion of the combustion tube 402 may be annularly positioned around the spring 404, where the smaller diameter end of the spring 404 is more spaced from the combustion tube 402 than the larger diameter end of the spring 404 is from the combustion tube 402.

In some example embodiments, when the combustion tube assembly 400 is installed in a water heater, such as the water heater 100 of FIG. 1, the hot exhaust gas resulting from the combustion of the water heater fuel proximal to the open end 412 of the combustion tube 402 flows down toward the closed end 414 and exits the combustion tube 402 through the outflow opening 408. The flow direction of the hot exhaust gas in the combustion tube 402 is shown by arrows 416, where the blower of the combustion system 108 of the water heater 100 pushes the hot exhaust gas downwardly away from the open end 412 toward the closed end 414.

In some example embodiments, as the hot exhaust gas flows down toward the closed end 414, some of the hot exhaust gas flows in the space between the spring 404 and the combustion tube 402, and some of the hot exhaust gas flows through the center of the spring 404. The redirection of some of the hot exhaust gas among spaces that are outside and inside the spring 404 disturbs the more laminar flow of the hot exhaust gas, which results in improved transfer of heat from the hot exhaust gas to the combustion tube 402. As the hot exhaust gas flowing down toward the closed end 414 encounters more of the windings of the spring 404, the hot exhaust gas experiences more turbulence, which also results in improved transfer of heat from the hot exhaust gas to the combustion tube 402 by disrupting the more laminar flow of the hot exhaust gas flowing down toward the closed end 414 and reaching the spring 404. In some cases, in comparison to the combustion tube assembly 200, the combustion tube assembly 400 may cause more turbulence in the hot exhaust gas because of more direct exposure of the hot exhaust gas to the windings of the spring 404.

In some example embodiments, the outflow opening 408 may be located proximal to the closed end 414. In contrast to the outflow opening 208 in the combustion tube 202 of FIG. 2, the outflow opening 408 may be at a slightly higher location to accommodate the larger diameter end of the spring 404 that may be relatively closer to the combustion tube 404. The hot exhaust gas exits the combustion tube 402 through the outflow opening 408 after having transferred some of its heat to the combustion tube 402.

The combustion tube assembly 400 results in a more efficient heating of the water contained in a water tank of a water heater, such as the water heater 100, compared to a combustion tube that does not have the spring 404 positioned therein. The disturbances of the hot exhaust gas flowing down through and around the spring 404 result in an increased transfer of heat from the hot exhaust gas to the combustion tube 402, thereby increasing the transfer of heat from the hot exhaust gas to the water in the water tank, such as the water tank 102, through the combustion tube 402.

In some example embodiments, the combustion tube 402 and the spring 404 may be made from a material that is suitable for use in a water heater as can be readily understood by those of ordinary skill in the art with the benefit of this disclosure. For example, the combustion tube may be made from steel. As another example, the spring 404 may be made from stainless steel or Inconel in a manner known by those of ordinary skill in the art with the benefit of this disclosure. In some example embodiments, the outflow opening 408 may extend less out or may not extend out as shown in FIG. 4 and may, for example, be flush with the combustion tube 402.

In some alternative embodiments, the spring 404 may be shorter or longer relative to the combustion tube 402 than shown in FIG. 4. In some alternative embodiments, the spring 404 may have a smaller or larger diameter than shown in FIG. 4. In some alternative embodiments, the spring 404 may have a smaller or larger pitch than shown in FIG. 4 without departing from the scope of this disclosure. In some alternative embodiments, the spring 404 may have a different shape than shown in FIG. 4 without departing from the scope of this disclosure. For example, the spring 404 may have a non-conical shape. As another example, the spring 404 may include multiple sections, where one or more of the sections are non-conical. In some alternative embodiments, the outflow opening 408 may be at a different location than shown without departing from the scope of this disclosure. In some alternative embodiments, the combustion tube 402 and/or the spring 404 may have a different shape than shown without departing from the scope of this disclosure.

Figure 5:
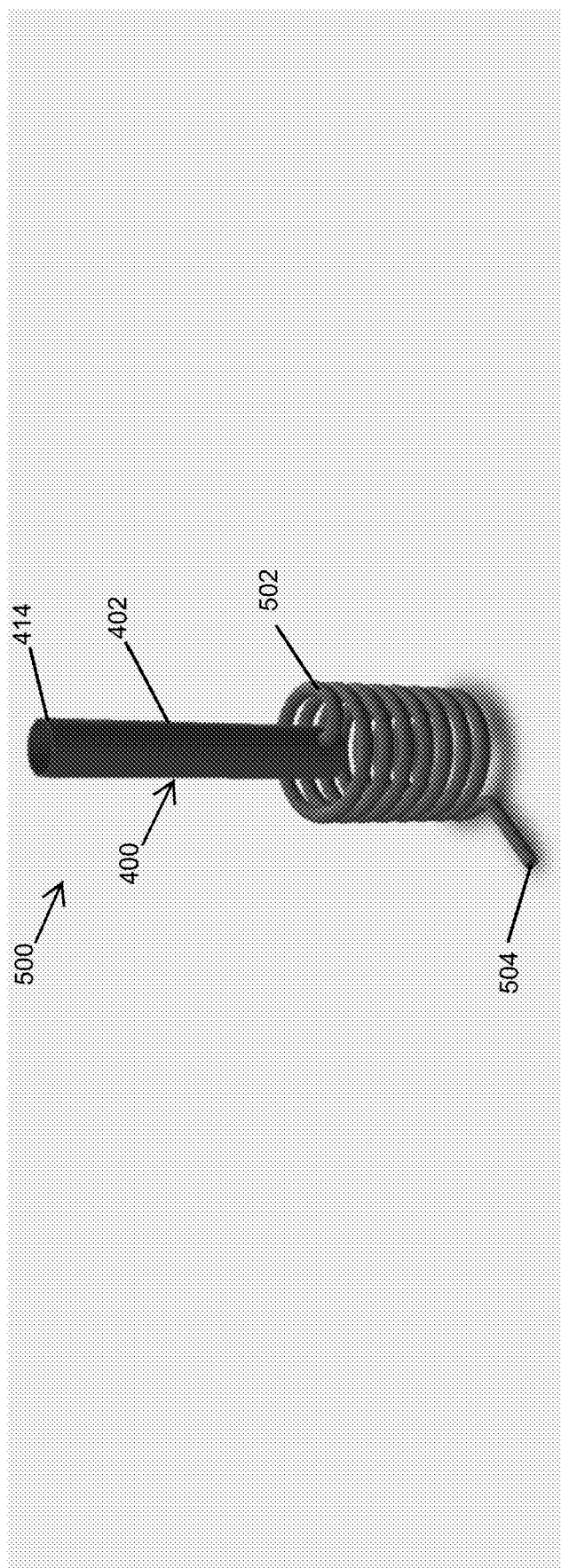
FIG. 5 illustrates a side view of a heat exchanger assembly including the combustion tube assembly of FIG. 4 according to an example embodiment.

FIG. 5 illustrates a side view of a heat exchanger assembly 500 including the combustion tube assembly 400 of FIG. 4 according to an example embodiment. In some example embodiments, the heat exchanger assembly 500 of FIG. 5 may correspond to or may be used in place of the combustion tube assembly 110 and the heat exchanger 112 shown in FIG. 1. Referring to FIGS. 1, 4, and 5, the heat exchanger assembly 500 includes the combustion tube assembly 400 and the heat exchanger 502. The heat exchanger 502 is attached to the combustion tube 402 at the outflow opening 408 of the combustion tube 402. For example, the heat exchanger 502 may be welded or attached by other means as can be readily contemplated by those of ordinary skill in the art with the benefit of this disclosure.

In some example embodiments, when the heat exchanger assembly 500 is installed in a water heater, such as the water heater 100, more heat is transferred from the hot exhaust gas to the water through the combustion tube 402 compared to the amount of heat transferred to the water through a typical combustion tube that does not include the spring 404. The hot exhaust gas that flows in the combustion tube 402 enters the heat exchanger 502 from the combustion tube 402 through the outflow opening 408 after transferring some of its heat to the water through the combustion tube 402.

The exhaust gas exiting the combustion tube 402 enters the heat exchanger 502 through the outflow opening 408 and flows through the heat exchanger 502. To illustrate, the heat exchanger 502 may be a hollow coil that has an inflow opening that is aligned with the outflow opening 408. The exhaust gas in the heat exchanger 502 transfers heat to the water in the water tank through the heat exchanger 502 as the exhaust gas flows through the heat exchanger 502. The exhaust gas leaves the heat exchanger 502 through an exhaust outlet 504. Because the exhaust gas transfers heat to the water through the heat exchanger 502 as it flows through the heat exchanger 502, the exhaust gas has a lower temperature at the exhaust outlet 504 than at the outflow opening 408.

By increasing the transfer of heat through the combustion tube 402 of the combustion tube assembly 400, the heat transfer efficiency of the heat exchanger assembly 500 is increased. The combustion tube assembly 400 and the heat exchanger assembly 500 allow more of the heat produced in the combustion tube 402 to be utilized by a water heater such as the water heater 100.

In some example embodiments, the heat exchanger 502 may be made from a suitable material as can be readily contemplated by those of ordinary skill in the art with the benefit of this disclosure. For example, the heat exchanger 502 may be made from steel or another material using methods, such as bending, etc., known by those of ordinary skill in the art with the benefit of this disclosure.

In some alternative embodiments, the heat exchanger 502 may have fewer windings than shown without departing from the scope of this disclosure. In some alternative embodiments, the heat exchanger 502 may have a different shape than shown without departing from the scope of this disclosure. In some alternative embodiments, the heat exchanger 502 may be attached to the combustion tube 402 at a different location than shown without departing from the scope of this disclosure. In some alternative embodiments, the relative heights of the combustion tube 402 and the heat exchanger 502 may be different than shown without departing from the scope of this disclosure.

Figure 6:
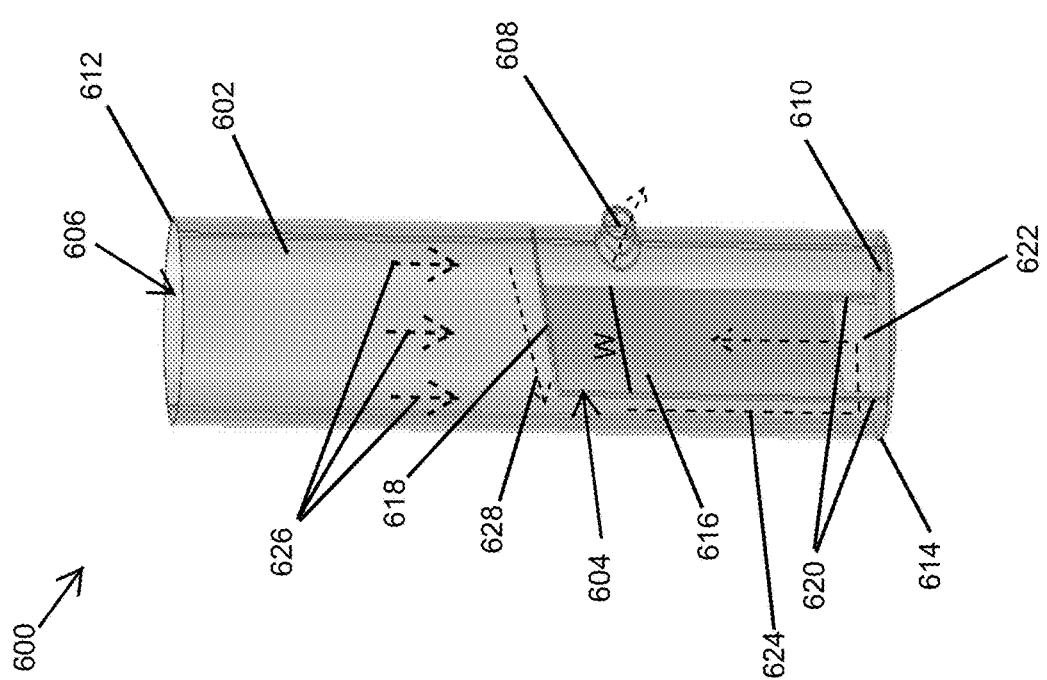
FIG. 6 illustrates a side view of a combustion tube assembly of a water heater including a combustion tube shown as a transparent structure according to another example embodiment.

FIG. 6 illustrates a side view of a combustion tube assembly of a water heater including a combustion tube shown as a transparent structure according to another example embodiment. Referring to FIGS. 1 and 6, in some example embodiments, the combustion tube assembly 600 of FIG. 6 may correspond to the combustion tube assembly 110 shown in FIG. 1 or may be used in the water heater 100 in place of the combustion tube assembly 110.

In some example embodiments, the combustion tube assembly 600 includes a combustion tube 602 and a diverter structure 604 that is positioned in a cavity 606 of the combustion tube 602. The combustion tube 602 has an open end 612, a closed end 614, and an outflow opening 608. The outflow opening 608 is located between the open end 612 and the closed end 614. The portion of the cavity 606 of the combustion tube 602 proximal to the open end 612 provides a chamber for combustion of a water heater fuel, such as propane, etc. The outflow opening 608 provides an outlet for an exhaust gas resulting from the combustion of the water heater fuel to exit the combustion tube 602 after being diverted by the diverter structure 604 as described below.

In some example embodiments, the diverter structure 604 is positioned inside the combustion tube 602 closer to the closed end 614 of the combustion tube 602 than to the open end 612 of the combustion tube 602. For example, the combustion tube 602 may be closed at the closed end by a cover structure 610, and the diverter structure 604 may be attached to the cover structure 610. To illustrate, the diverter structure 604 may be attached to the cover structure 610 before the cover structure 610 is attached to the combustion tube 602. After the diverter structure 604 is attached to the cover structure 610, the diverter structure 604 may be inserted in the combustion tube 602 and the cover structure 610 may be attached to the combustion tube 602 using methods such as welding or other methods that can be contemplated by those of ordinary skill in the art with the benefit of this disclosure. For example, the combustion tube 602 may be sealed at the closed end 614 by the cover structure 610 such that exhaust gas does not exit the combustion tube 602 through the closed end 614.

As illustrated in FIG. 6, in some example embodiments, the diverter structure 604 may include a wall section 616 and a slanted section 618. The slanted section 618 may be slanted down toward the wall section 616, and the wall section 616 may extend down from the slanted section 618, for example, at an end of the slanted section 618. The diverter structure 604 may include legs 620 that extend down from the wall section 618. For example, the legs 610 may be attached to the cover structure 610 and may provide the structural support to keep the diverter structure 604 attached inside the combustion tube 602. To illustrate, the legs 620 may be welded to the cover structure 610.

In some alternative embodiments, the diverter structure 604 may include more or fewer legs than shown without departing from the scope of this disclosure. In some alternative embodiments, the legs 620 may extend down from the wall section 616 at different locations than shown without departing from the scope of this disclosure. For example, the legs 610 may be spaced from each other less than shown in FIG. 6. In some alternative embodiments, the legs 620 may be wider, narrower, or may otherwise have a different shape than shown without departing from the scope of this disclosure.

In some example embodiments, the diverter structure 604 may not be in direct contact with the combustion tube 602, which may be a cylindrical tube as shown in FIG. 6. For example, when the wall section 616 extends through the diametrical center of the combustion tube 602, the width W of the diverter structure 604 may be slightly less than the inner diameter of the combustion tube 602 so that the diverter structure 604 is not in direct contact with the combustion tube 602. In some embodiments, the wall section 616 may be attached to the cover structure 610 shifted from the diametrical center of the combustion tube 602, where the width W of the diverter structure 604 may be smaller than the width of the diverter structure 604 in embodiments where the wall section 616 is positioned through the diametrical center of the combustion tube 602.

In some example embodiments, when the combustion tube assembly 600 is installed in water heater, such as the water heater 100 of FIG. 1, the hot exhaust gas produced from the combustion of the water heater fuel in the combustion tube 602 proximal to the open end 612 flows down toward the closed end 614. The flow direction of the hot exhaust gas in the combustion tube 602 is shown by arrows 626, where, for example, the blower of the combustion system 108 of the water heater 100 pushes the hot exhaust gas downwardly toward the closed end 614.

As the hot exhaust gas flows down toward the closed end 614, the hot exhaust gas is diverted by the slanted section 618 of the diverter structure 604 toward the relatively narrow space between the wall section 616 and the combustion tube 602 on a first side of the diverter structure 604. The general direction of the diverted hot exhaust gas as the hot exhaust gas is being diverted by the slanted section 618 is shown by the arrow 628. The hot exhaust gas that is diverted by the slanted section 618 flows down toward the closed end 614 of the combustion tube 602 on the first side of the diverter structure 604 and flows to a second side of the diverter structure 604 through a flow opening 622 proximal to the closed end 614. For example, the flow opening 622 may be bound by the wall section 616 and the cover structure 610. The hot exhaust gas that passes to the second side of the diverter structure 604 flows back up on the second side of the diverter structure 604 and exits the combustion tube 604 through the outflow opening 608 that is located below the slanted section 618. For example, the outflow opening 608 may be located proximal to the slanted section 618 and relatively distal from the closed end 614.

The diversion of the hot exhaust gas by the diverter structure 604 causes turbulence in the hot exhaust gas, which results in the disruption of the more laminar flow of the hot exhaust gas reaching the slanted section 618. The relatively narrow space between the wall section 616 and the combustion tube 602 also results in the hot exhaust gas flowing at a faster velocity as the hot exhaust gas flows down on one side of the diverter structure 604. The resulting turbulent flow of the hot exhaust gas results in improved transfer of heat from the hot exhaust gas to the combustion tube 602.

The combustion tube assembly 600 results in a more efficient heating of the water contained in a water tank of a water heater, such as the water heater 100, compared to a combustion tube that does not have the diverter structure 604 positioned therein. The disturbances of the hot exhaust gas as the hot exhaust gas is diverted to flow down on the first side of the diverter structure 604 and back up on the second side of the diverter structure 604 to reach the outflow opening 608 result in an increased transfer of heat from the hot exhaust gas to the combustion tube 602, thereby increasing the transfer of heat from the hot exhaust gas to the water in the water tank, such as the water tank 102, through the combustion tube 602.

In some example embodiments, the combustion tube 602 and the diverter structure 604 may be made from a material that is suitable for use in a water heater as can be readily understood by those of ordinary skill in the art with the benefit of this disclosure. For example, the combustion tube may be made from steel. As another example, the diverter structure 604 may be made from stainless steel or Inconel in a manner known by those of ordinary skill in the art with the benefit of this disclosure. In some example embodiments, the outflow opening 608 may extend out less or may not extend out as shown in FIG. 6 and may, for example, be flush with the combustion tube 602.

In some alternative embodiments, the diverter structure 604 may be shorter or longer relative to the combustion tube 602 than shown in FIG. 6. In some alternative embodiments, the slanted section 618 may be slanted at a smaller or larger angle than shown in FIG. 6 without departing from the scope of this disclosure. In some alternative embodiments, the slanted section 618 may be shorter or longer than shown in FIG. 6 without departing from the scope of this disclosure. In some alternative embodiments, the outflow opening 608 may be at a different location than shown without departing from the scope of this disclosure.

In some alternative embodiments, the combustion tube 602 and/or the diverter structure 604 may have a different shape than shown without departing from the scope of this disclosure. In some example embodiments, the wall section 918 may be perpendicular or non-perpendicular to the cover structure 910. In some alternative embodiments, the flow opening 622 may have a different shape and/or size than shown without departing from the scope of this disclosure. In some alternative embodiments, the flow opening 622 may be at a higher location than shown without departing from the scope of this disclosure. For example, the flow opening 622 may be formed entirely through the wall section 616.

Figure 7:
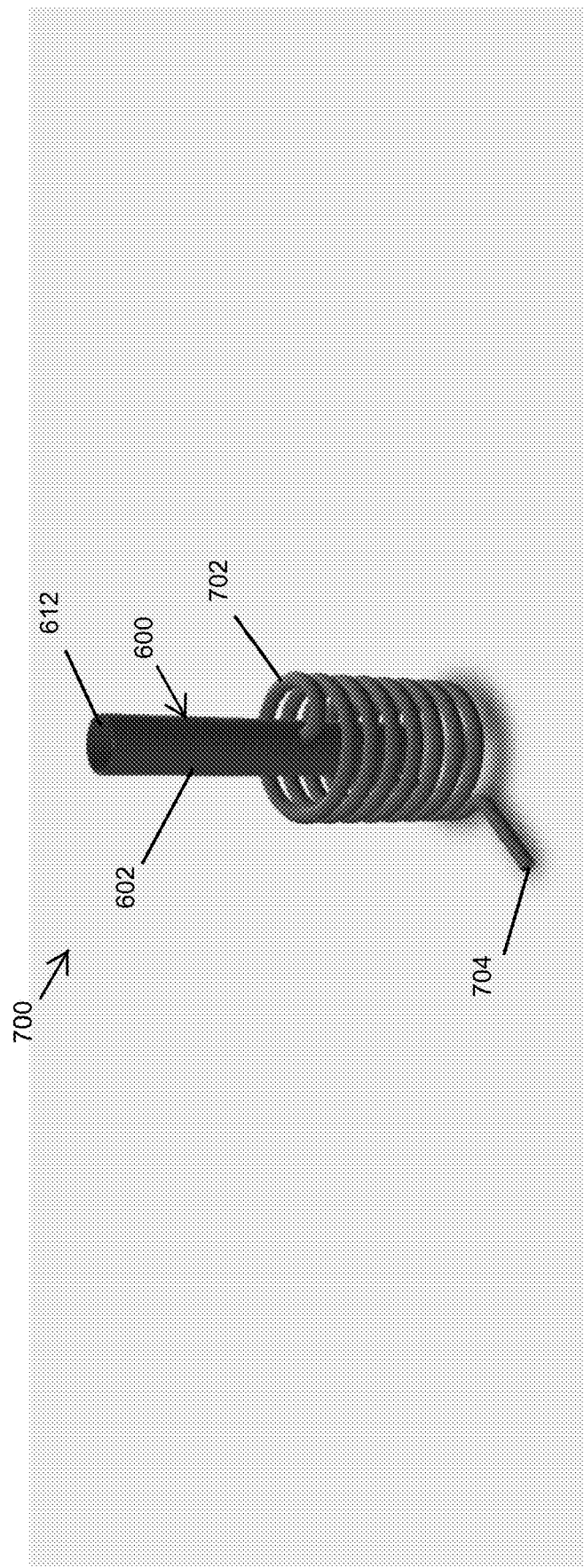
FIG. 7 illustrates a side view of a heat exchanger assembly including the combustion tube assembly of FIG. 6 according to an example embodiment.
Figure 8A:
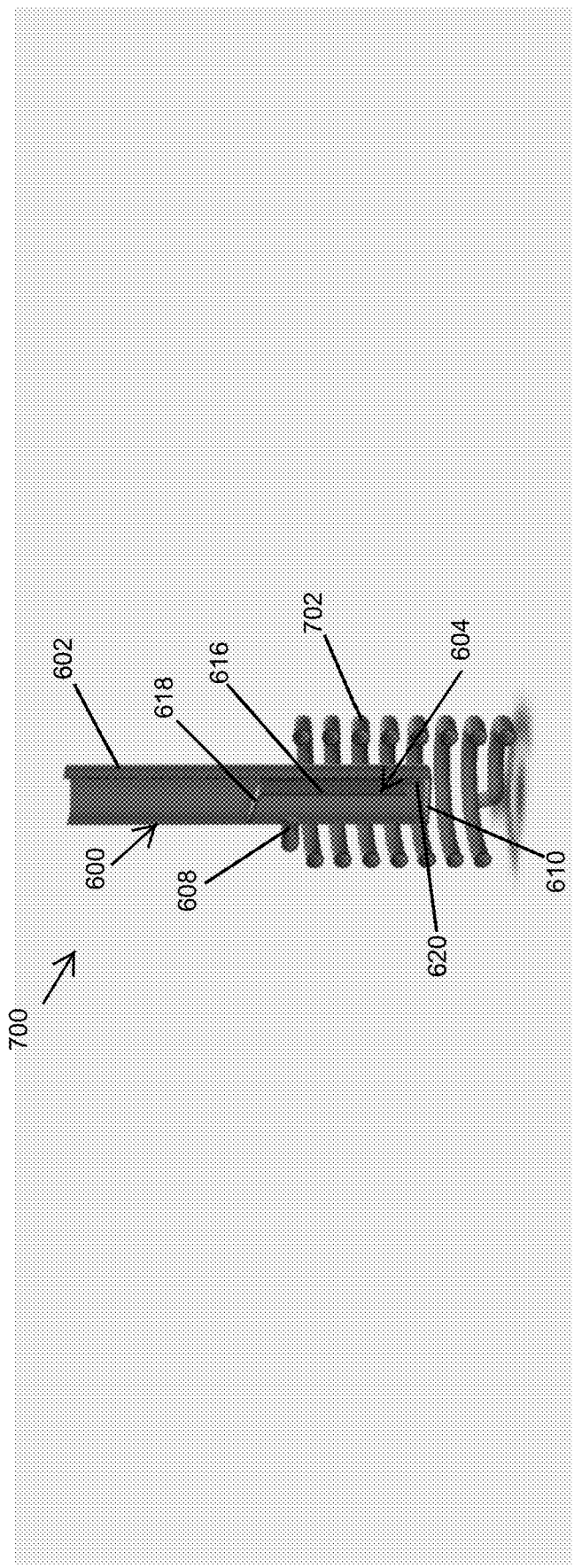
FIG. 8A illustrates a vertical cross-sectional view of the heat exchanger assembly of FIG. 7 according to an example embodiment.
Figure 8B:
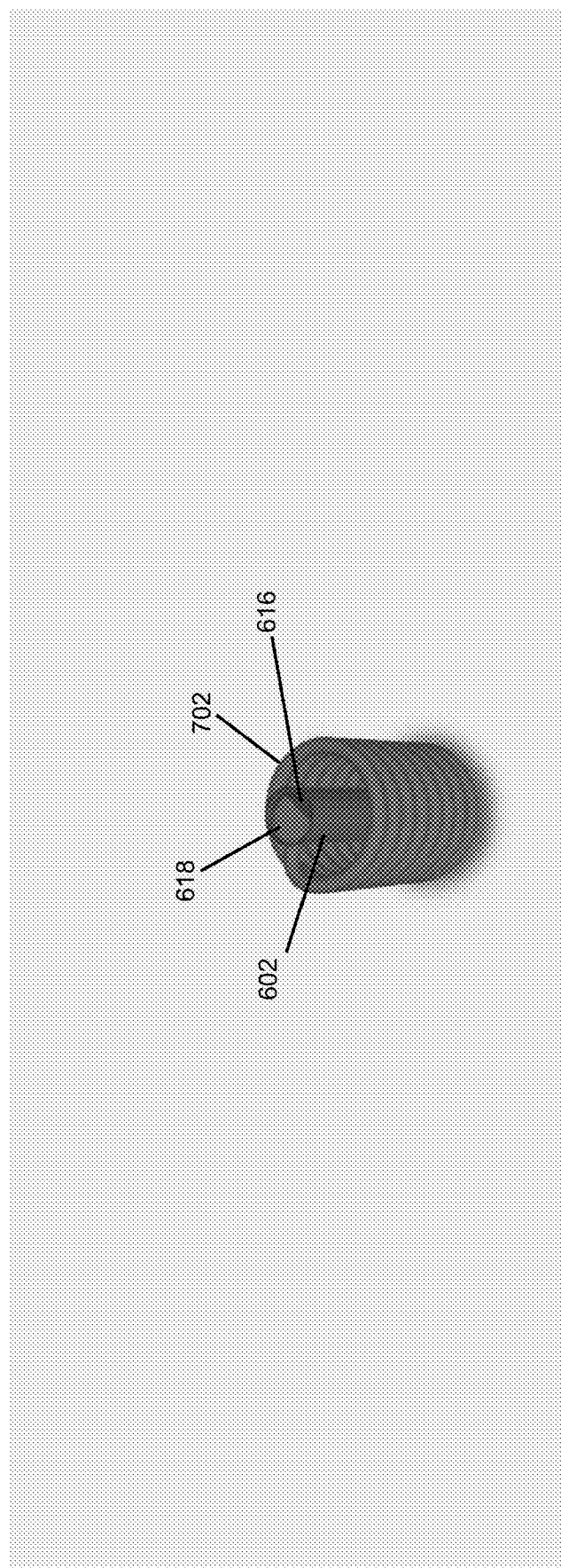
FIG. 8B illustrates a horizontal cross-sectional view of the heat exchanger assembly of FIG. 7 according to an example embodiment.

FIG. 7 illustrates a side view of a heat exchanger assembly 700 including the combustion tube assembly 600 of FIG. 6 according to an example embodiment. FIG. 8A illustrates a vertical cross-sectional view of the heat exchanger assembly 700 of FIG. 7 according to an example embodiment. FIG. 8B illustrates a horizontal cross-sectional view of the heat exchanger assembly 700 of FIG. 7 according to an example embodiment. Referring to FIGS. 1 and 6-8B, the heat exchanger assembly 700 of FIG. 7 may correspond to or may be used in place of the combustion tube assembly 110 and the heat exchanger 112 shown in FIG. 1. In some example embodiments, the heat exchanger assembly 700 includes the combustion tube assembly 600 and the heat exchanger 702. The heat exchanger 702 is attached to the combustion tube 602 at the outflow opening 608 of the combustion tube 602. For example, the heat exchanger 702 may be welded or attached by other means as can be readily contemplated by those of ordinary skill in the art with the benefit of this disclosure.

In some example embodiments, when the heat exchanger assembly 700 is installed in a water heater, such as the water heater 100, more heat is transferred from the hot exhaust gas to the water through the combustion tube 602 compared to the amount of heat transferred to the water through a typical combustion tube that does not include the diverter structure 604. The hot exhaust gas that flows in the combustion tube 602 enters the heat exchanger 702 from the combustion tube 602 through the outflow opening 608 after transferring some of its heat to the water through the combustion tube 602. As described above, the diverter structure 604 includes the wall section 616 and the slanted section 618 that divert and direct the hot exhaust gas to flow down on one side of the wall section 616 and back up on a second (opposite) side of the wall section 616 after flowing through the flow opening 622, where the hot exhaust gas exits the combustion tube 602 through the outflow opening 608 on the second side of the wall section 616.

The exhaust gas exiting the combustion tube 602 enters the heat exchanger 702 through the outflow opening 608 and flows through the heat exchanger 702. To illustrate, the heat exchanger 702 may be a hollow coil that has an inflow opening that is aligned with the outflow opening 608. The exhaust gas in the heat exchanger 702 transfers heat to the water in the water tank through the heat exchanger 702 as the exhaust gas flows through the heat exchanger 702. The exhaust gas leaves the heat exchanger 702 through an exhaust outlet 704. Because the exhaust gas transfers heat to the water through the heat exchanger 702 as it flows through the heat exchanger 702, the exhaust gas has a lower temperature at the exhaust outlet 704 than at the outflow opening 608.

By increasing the transfer of heat through the combustion tube 602 of the combustion tube assembly 600, the heat transfer efficiency of the heat exchanger assembly 700 is increased. The combustion tube assembly 600 and the heat exchanger assembly 700 allow more of the heat produced in the combustion tube 602 to be utilized by a water heater such as the water heater 100.

In some example embodiments, the heat exchanger 702 may be made from a suitable material as can be readily contemplated by those of ordinary skill in the art with the benefit of this disclosure. For example, the heat exchanger 702 may be made from steel or another material using methods, such as bending, etc., known by those of ordinary skill in the art with the benefit of this disclosure.

In some alternative embodiments, the heat exchanger 702 may have fewer windings than shown without departing from the scope of this disclosure. In some alternative embodiments, the heat exchanger 702 may have a different shape than shown without departing from the scope of this disclosure. In some alternative embodiments, the heat exchanger 702 may be attached to the combustion tube 602 at a different location than shown without departing from the scope of this disclosure. In some alternative embodiments, the relative heights of the combustion tube 602 and the heat exchanger 702 may be different than shown without departing from the scope of this disclosure.

Figure 9:
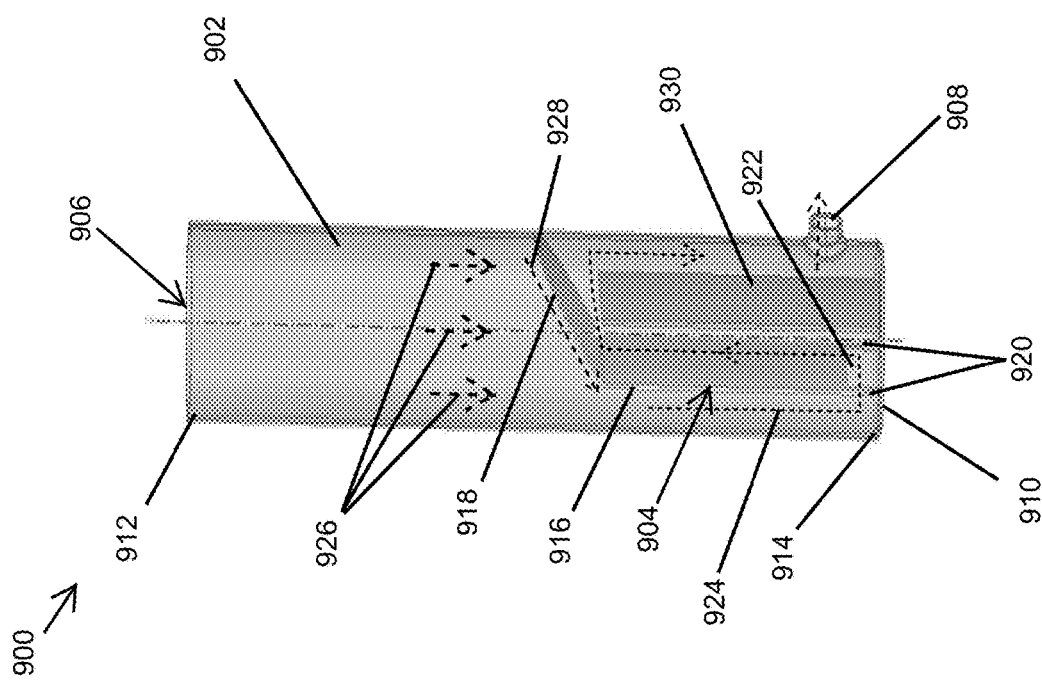
FIG. 9 illustrates a side view of a combustion tube assembly of a water heater including a combustion tube shown as a transparent structure according to another example embodiment.

FIG. 9 illustrates a side view of a combustion tube assembly 900 including a combustion tube 902 shown as a transparent structure for illustrative purposes according to another example embodiment. Referring to FIGS. 1 and 9, in some example embodiments, the combustion tube assembly 900 of FIG. 9 may correspond to the combustion tube assembly 110 shown in FIG. 1 or may be used in the water heater 100 in place of the combustion tube assembly 110.

In some example embodiments, the combustion tube assembly 900 includes a combustion tube 902, a diverter structure 904, and a separator structure 930. The diverter structure 904 and a separator structure 930 are positioned in a cavity 906 of the combustion tube 902. The combustion tube 902 has an open end 912, a closed end 914, and an outflow opening 908. The outflow opening 908 is located between the open end 912 and the closed end 914. The portion of the cavity 906 of the combustion tube 902 proximal to the open end 912 provides a chamber for combustion of a water heater fuel, such as propane, etc. The outflow opening 908 provides an outlet for an exhaust gas resulting from the combustion of the water heater fuel to exit the combustion tube 902 after being diverted by the diverter structure 904 and the separator structure 930 as described below.

In some example embodiments, the diverter structure 904 and the separator structure 930 are positioned inside the combustion tube 902 closer to the closed end 914 of the combustion tube 902 than to the open end 912 of the combustion tube 902. For example, the combustion tube 902 may be closed at the closed end by a cover structure 910, and the diverter structure 904 and the separator structure 930 may be attached to the cover structure 910. To illustrate, the diverter structure 904 and the separator structure 930 may be attached to the cover structure 910 before the cover structure 910 is attached to the combustion tube 902. After the diverter structure 904 and the separator structure 930 are attached to the cover structure 910, the diverter structure 904 and the separator structure 930 may be inserted in the combustion tube 902 and the cover structure 910 may be attached to the combustion tube 902 using methods such as welding or other methods that can be contemplated by those of ordinary skill in the art with the benefit of this disclosure. For example, the combustion tube 902 may be sealed at the closed end 914 by the cover structure 910 such that exhaust gas does not exit the combustion tube 902 through the closed end 914.

As illustrated in FIG. 9, in some example embodiments, the diverter structure 904 may include a wall section 916 and a slanted section 918. The slanted section 918 may be slanted down toward the wall section 916, and the wall section 916 may extend down from the slanted section 918, for example, at an end of the slanted section 918. The diverter structure 904 may include legs 920 that extend down from the wall section 918. For example, the legs 910 may be attached to the cover structure 910 and may provide the structural support to keep the diverter structure 904 attached inside the combustion tube 902. To illustrate, the legs 920 may be welded to the cover structure 910.

In some alternative embodiments, the diverter structure 904 may include more or fewer legs than shown without departing from the scope of this disclosure. In some alternative embodiments, the legs 920 may extend down from the wall section 916 at different locations than shown without departing from the scope of this disclosure. For example, the legs 910 may be spaced from each other less than shown in FIG. 9. In some alternative embodiments, the legs 920 may be wider, narrower, or may otherwise have a different shape than shown without departing from the scope of this disclosure.

In some example embodiments, the separator structure 930 is positioned below the slanted section 918 of the diverter structure 904. The space between the separator structure 930 and the slanted section 918 provides a passageway for the hot exhaust gas to flow from a first side of the separator structure 930 to a second (opposite) side of the separator structure 930 before exiting through the outflow opening 908 on the second side of the separator structure 930.

In some example embodiments, the separator structure 930 may not be in direct contact with the combustion tube 902, which may be a cylindrical tube as shown in FIG. 9. The separator structure 930 may be sized such that the separator structure 930 does not come in direct contact with the combustion tube 902 while significantly limiting or preventing a flow of the hot exhaust gas through any vertical space between the separator structure 930 and the combustion tube 602.

In some example embodiments, the diverter structure 904 may not be in direct contact with the combustion tube 902. For example, when the wall section 916 extends through the diametrical center of the combustion tube 902, the width of the diverter structure 904 may be slightly less than the inner diameter of the combustion tube 902 so that the diverter structure 904 is not in direct contact with the combustion tube 902. In some embodiments, the wall section 916 is attached to the cover structure 910 shifted from the diametrical center of the combustion tube 902 as shown in FIG. 9, where the width of the diverter structure 904 may be smaller than the width of the diverter structure 904 in embodiments where the wall section 916 is positioned through the diametrical center of the combustion tube 902.

In some example embodiments, when the combustion tube assembly 900 is installed in water heater, such as the water heater 100 of FIG. 1, the hot exhaust gas produced from the combustion of the water heater fuel in the combustion tube 902 proximal to the open end 912 flows down toward the closed end 914. The flow direction of the hot exhaust gas in the combustion tube 902 is shown by arrows 926, where, for example, the blower of the combustion system 108 of the water heater 100 pushes the hot exhaust gas downwardly toward the closed end 914.

As the hot exhaust gas flows down toward the closed end 914, the hot exhaust gas is diverted by the slanted section 918 of the diverter structure 904 toward the relatively narrow space between the wall section 916 and the combustion tube 902. The arrow 928 shows the general direction of the hot exhaust gas being diverted by the slanted section 918. The hot exhaust gas that is diverted by the slanted section 918 flows down toward the closed end 914 of the combustion tube 902 on a first side of the diverter structure 904 and flows to a second side of the diverter structure 904 through a flow opening 922 that is proximal to the closed end 914 as indicated by the arrow 924. The hot exhaust gas that passes to the second side of the diverter structure 904 flows back up on the second side of the diverter structure 904 through a flow path between the wall section 916 of the diverter structure 904 and the separator structure 930 as indicated by the arrow 924. The hot exhaust gas continues to flow from the space between the wall section 916 and the separator structure 930 on a first side of the separator structure 930 to the space between the separator structure 930 and the combustion tube 902 on a second side of the separator structure 930 as indicated by the arrow 924. The separation space between the separator structure 930 and the slanted section 918 provides a passageway for the hot exhaust gas to flow from the first side of the separator structure 930 to the second (opposite) side of the separator structure 930.

The hot exhaust gas exits the combustion tube 904 through the outflow opening 908 that is located below the slanted section 918 on the second side of the separator structure 930. As illustrated in FIG. 9, the outflow opening 908 may be located proximal to the closed end 914 and relatively distal from the slanted section 918, which allows the hot exhaust gas to continue to transfer heat through the combustion tube 902 until the hot exhaust gas reaches the outflow opening 908.

The diversion of the hot exhaust gas by the diverter structure 904 causes turbulence in the hot exhaust gas, which results in the disruption of the more laminar flow of the hot exhaust gas reaching the slanted section 918. The flow paths through relatively narrow spaces as shown by the arrow 924 also results in the hot exhaust gas flowing at a relatively faster velocity, which results in a more turbulent flow. The resulting turbulent flow of the hot exhaust gas results in improved transfer of heat from the hot exhaust gas to the combustion tube 902. Further, the multiple passes of the hot exhaust gas inside the combustion tube 902 allow more heat to be transferred from the hot exhaust gas through the combustion tube 902.

The combustion tube assembly 900 results in a more efficient heating of the water contained in a water tank of a water heater, such as the water heater 100, compared to a combustion tube that does not have the diverter structure 904 and the separator structure 930 positioned therein. The disturbances of the hot exhaust gas as the hot exhaust gas is diverted to flow down on the first side of the diverter structure 904, back up on the second side of the diverter structure 904, and down on the second side of the separator structure 930 to reach the outflow opening 908 result in an increased transfer of heat from the hot exhaust gas to the combustion tube 902, thereby increasing the transfer of heat from the hot exhaust gas to the water in the water tank, such as the water tank 102, through the combustion tube 902.

In some example embodiments, the combustion tube 902, the diverter structure 904, and the separator structure 930 may be made from a material that is suitable for use in a water heater as can be readily understood by those of ordinary skill in the art with the benefit of this disclosure. For example, the combustion tube may be made from steel. As another example, the diverter structure 904 and the separator structure 930 may be made from stainless steel or Inconel in a manner known by those of ordinary skill in the art with the benefit of this disclosure. In some example embodiments, the outflow opening 908 may extend out less or may not extend out as shown in FIG. 9 and may, for example, be flush with the combustion tube 902.

In some alternative embodiments, the diverter structure 904 may be shorter or longer relative to the combustion tube 902 than shown in FIG. 9. In some alternative embodiments, the slanted section 918 may be slanted at a smaller or larger angle than shown in FIG. 9 without departing from the scope of this disclosure. In some alternative embodiments, the slanted section 918 may be shorter or longer than shown in FIG. 9 without departing from the scope of this disclosure. In some alternative embodiments, the outflow opening 908 may be at a different location than shown without departing from the scope of this disclosure.

In some alternative embodiments, the combustion tube 902, the diverter structure 904, and the separator structure 930 may have a different shape than shown without departing from the scope of this disclosure. In some alternative embodiments, the diverter structure 904 and the separator structure 930 may be formed as a single structure or may be connected to form a single structure. In some example embodiments, the wall section 918 and/or the separator section 930 may be perpendicular or non-perpendicular to the cover structure 910. In some alternative embodiments, the flow opening 922 may have a different shape and/or size than shown without departing from the scope of this disclosure. In some alternative embodiments, the flow opening 922 may be at a higher location than shown without departing from the scope of this disclosure. For example, the flow opening 922 may be formed entirely through the wall section 916.

Figure 10:
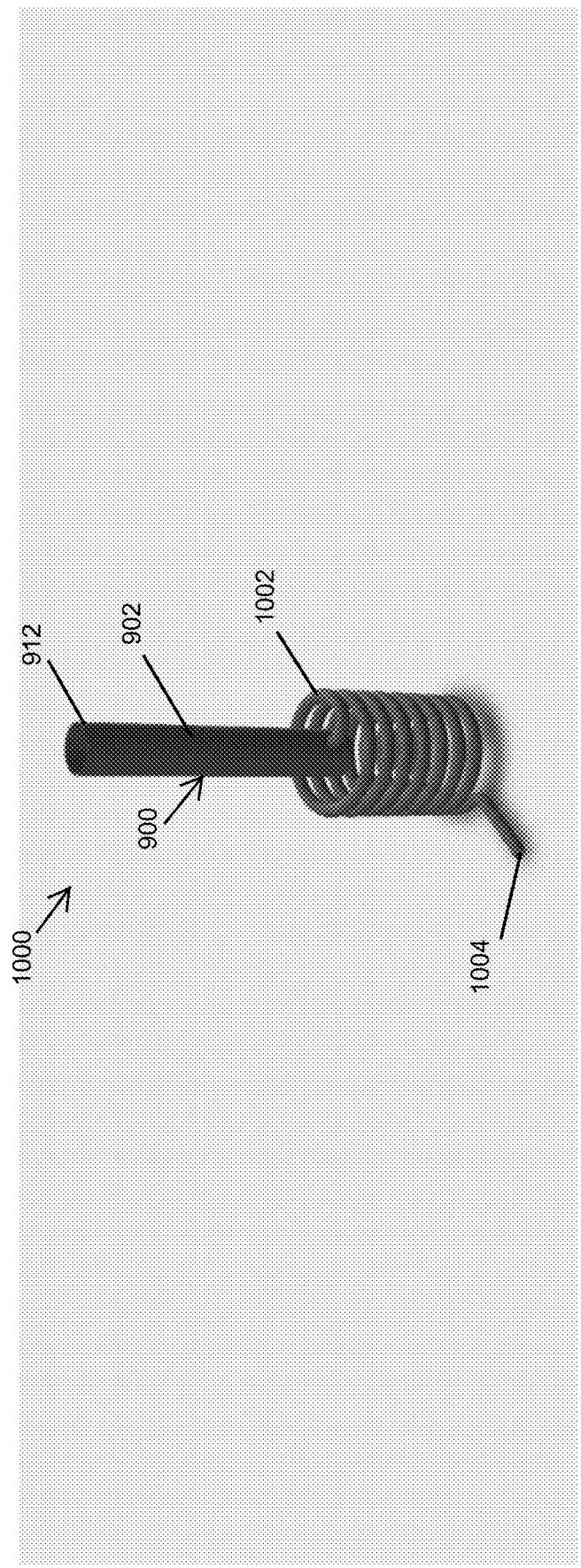
FIG. 10 illustrates a side view of a heat exchanger assembly including the combustion tube assembly of FIG. 9 according to an example embodiment.
Figure 11:
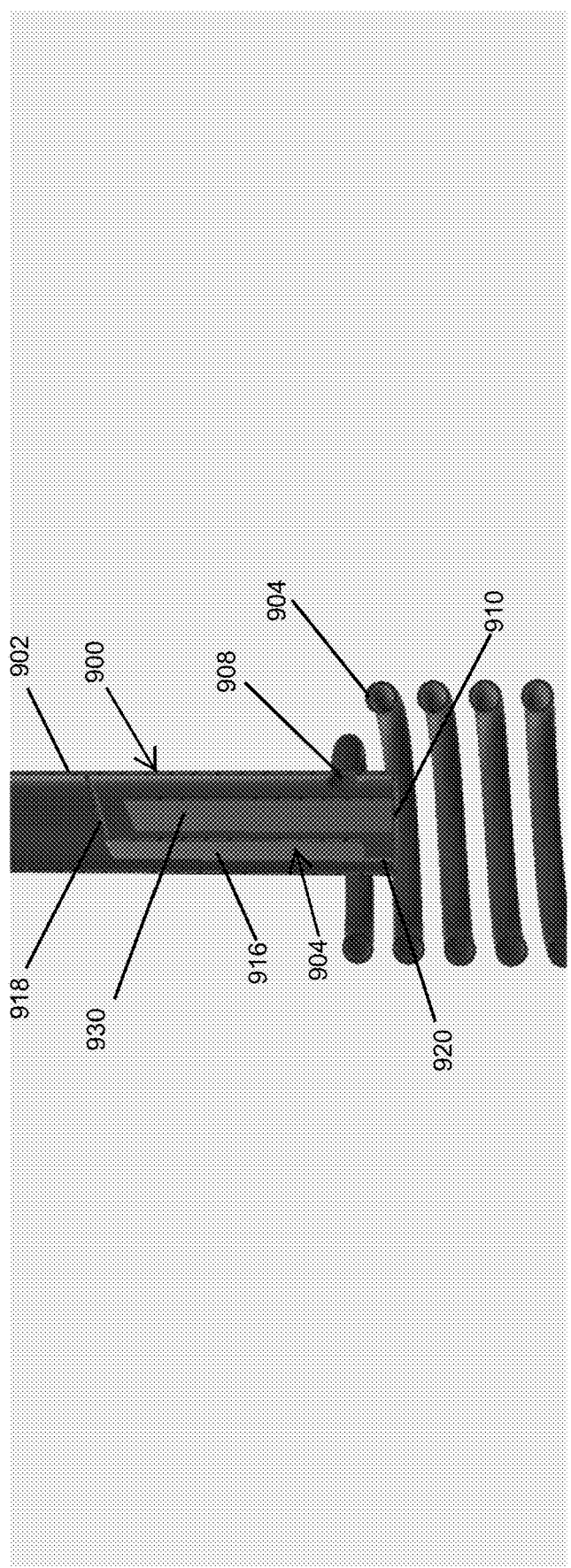
FIG. 11 illustrates a cross-sectional view of the heat exchanger assembly of FIG. 10 according to an example embodiment.

FIG. 10 illustrates a side view of a heat exchanger assembly 1000 including the combustion tube assembly 900 of FIG. 9 according to an example embodiment. FIG. 11 illustrates a cross-sectional view of the heat exchanger assembly 1000 of FIG. 10 according to an example embodiment. Referring to FIGS. 1 and 9-11, the heat exchanger assembly 1000 of FIG. 10 may correspond to or may be used in place of the combustion tube assembly 110 and the heat exchanger 112 shown in FIG. 1.

In some example embodiments, the heat exchanger assembly 1000 includes the combustion tube assembly 900 and the heat exchanger 1002. The heat exchanger 1002 is attached to the combustion tube 902 at the outflow opening 908 of the combustion tube 902. For example, the heat exchanger 1002 may be welded or attached by other means as can be readily contemplated by those of ordinary skill in the art with the benefit of this disclosure.

In some example embodiments, when the heat exchanger assembly 1000 is installed in a water heater, such as the water heater 100, more heat is transferred from the hot exhaust gas to the water through the combustion tube 902 compared to the amount of heat transferred to the water through a typical combustion tube that does not include the diverter structure 904 and the separator structure 930. The hot exhaust gas that flows in the combustion tube 902 enters the heat exchanger 1002 through the outflow opening 908 of the combustion tube 902 after transferring some of its heat to the water through the combustion tube 902. As described above, the diverter structure 904 includes the wall section 916 and the slanted section 918 that divert and direct the hot exhaust gas to flow down on one side of the wall section 916 and back up on the opposite side of the wall section 916. The separator structure 930 directs the hot exhaust gas to flow down to the outflow opening 908, where the hot exhaust gas exits the combustion tube 902 through the outflow opening 908.

The exhaust gas exiting the combustion tube 902 enters the heat exchanger 1002 through the outflow opening 908 and flows through the heat exchanger 1002. To illustrate, the heat exchanger 1002 may be a hollow coil that has an inflow opening that is aligned with the outflow opening 908. The exhaust gas in the heat exchanger 1002 transfers heat to the water in the water tank through the heat exchanger 1002 as the exhaust gas flows through the heat exchanger 1002. The exhaust gas leaves the heat exchanger 1002 through an exhaust outlet 1004. Because the exhaust gas transfers heat to the water through the heat exchanger 1002 as it flows through the heat exchanger 1002, the exhaust gas has a lower temperature at the exhaust outlet 1004 than at the outflow opening 908.

By increasing the transfer of heat through the combustion tube 902 of the combustion tube assembly 900, the overall heat transfer efficiency of the heat exchanger assembly 1000 is increased. The combustion tube assembly 900 and the heat exchanger assembly 1000 allow more of the heat produced in the combustion tube 902 to be utilized by a water heater such as the water heater 100.

In some example embodiments, the heat exchanger 1002 may be made from a suitable material as can be readily contemplated by those of ordinary skill in the art with the benefit of this disclosure. For example, the heat exchanger 1002 may be made from steel or another material using methods, such as bending, etc., known by those of ordinary skill in the art with the benefit of this disclosure.

In some alternative embodiments, the heat exchanger 1002 may have fewer windings than shown without departing from the scope of this disclosure. In some alternative embodiments, the heat exchanger 1002 may have a different shape than shown without departing from the scope of this disclosure. In some alternative embodiments, the heat exchanger 1002 may be attached to the combustion tube 902 at a different location than shown without departing from the scope of this disclosure. In some alternative embodiments, the relative heights of the combustion tube 902 and the heat exchanger 1002 may be different than shown without departing from the scope of this disclosure.

Figure 12:
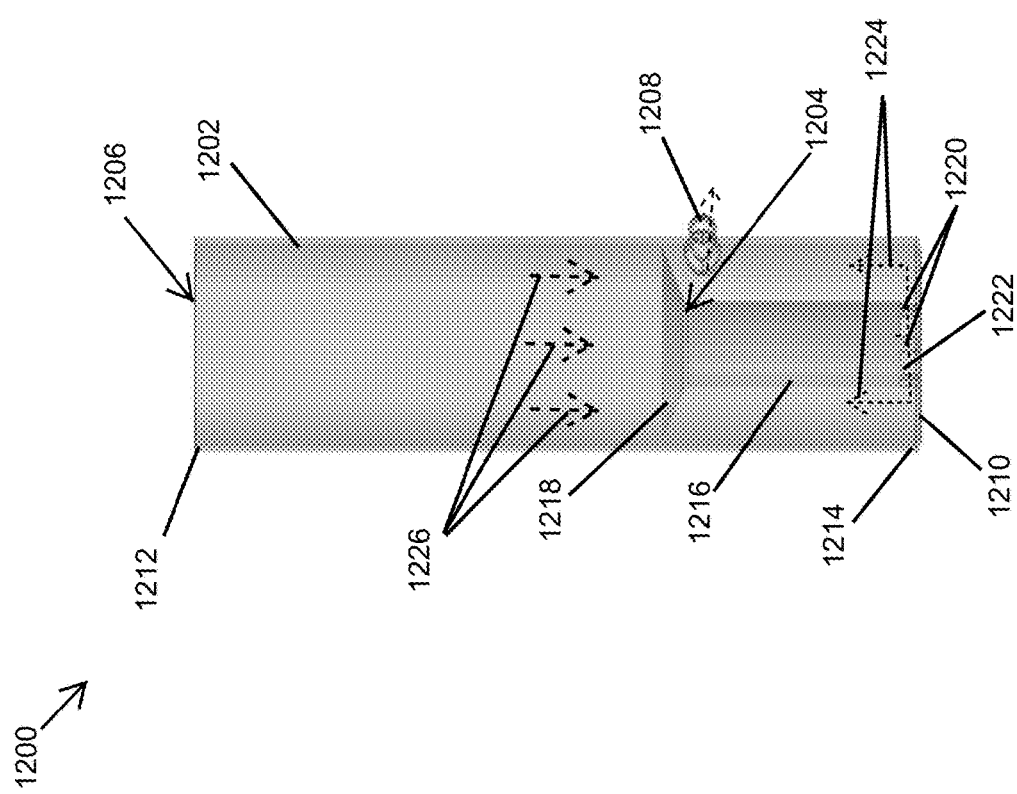
FIG. 12 illustrates a side view of a combustion tube assembly of a water heater including a combustion tube shown as a transparent structure according to another example embodiment.

FIG. 12 illustrates a side view of a combustion tube assembly 1200 including a combustion tube 1202 shown as a transparent structure for illustrative purposes according to another example embodiment. Referring to FIGS. 1 and 12, in some example embodiments, the combustion tube assembly 1200 of FIG. 12 may correspond to the combustion tube assembly 110 shown in FIG. 1 or may be used in the water heater 100 in place of the combustion tube assembly 110.

In some example embodiments, the combustion tube assembly 1200 includes a combustion tube 1202 and a diverter structure 1204 that is positioned in a cavity 1206 of the combustion tube 1202. The combustion tube 1202 has an open end 1212, a closed end 1214, and an outflow opening 1208. The outflow opening 1208 is located between the open end 1212 and the closed end 1214. The portion of the cavity 1206 of the combustion tube 1202 proximal to the open end 1212 provides a chamber for combustion of a water heater fuel, such as propane, etc. The outflow opening 1208 provides an outlet for an exhaust gas resulting from the combustion of the water heater fuel to exit the combustion tube 1202 after being diverted by the diverter structure 1204 as described below.

In some example embodiments, the diverter structure 1204 is positioned inside the combustion tube 1202 closer to the closed end 1214 of the combustion tube 1202 than to the open end 1212 of the combustion tube 1202. For example, the combustion tube 1202 may be closed at the closed end by a cover structure 1210, and the diverter structure 1204 may be attached to the cover structure 1210. To illustrate, the diverter structure 1204 may be attached to the cover structure 1210 before the cover structure 1210 is attached to the combustion tube 1202. After the diverter structure 1204 is attached to the cover structure 1210, the diverter structure 1204 may be inserted in the combustion tube 1202 and the cover structure 1210 may be attached to the combustion tube 1202 using methods such as welding or other methods that can be contemplated by those of ordinary skill in the art with the benefit of this disclosure. For example, the combustion tube 1202 may be sealed at the closed end 1214 by the cover structure 1210 such that exhaust gas does not exit the combustion tube 1202 through the closed end 1214.

As illustrated in FIG. 12, in some example embodiments, the diverter structure 1204 may include a narrow section 1216 and a wide section 1218. For example, the narrow section 1216 and the wide section 1218 together form a funnel shaped structure. To illustrate, the wide section 1218 may have an upside down cone shape, and the narrow section 1216 may extend down from the narrow end of the wide section 1218. For example, the narrow section 1216 may be a hollow cylinder. The narrow section 1216 and a portion of the combustion tube 1202 may form an annular space therebetween.

In some example embodiments, the diverter structure 1204 may include legs 1220 that extend down from the narrow section 1218 and that are attached to the cover structure 1210. For example, the legs 1210 may provide the structural support to keep the diverter structure 1204 attached inside the combustion tube 1202. The legs 1220 may be welded to the cover structure 1210.

In some alternative embodiments, the diverter structure 1204 may include more or fewer legs than shown without departing from the scope of this disclosure. In some alternative embodiments, the legs 1220 may extend down from the wall section 1216 at different locations than shown without departing from the scope of this disclosure. For example, the legs 1210 may be spaced from each other less than shown in FIG. 12. In some alternative embodiments, the legs 1220 may be wider, narrower, or may otherwise have a different shape than shown without departing from the scope of this disclosure.

In some example embodiments, the diverter structure 1204 may be centrally located in the combustion tube 1202. For example, the diverter structure 1204 may be concentric with the combustion tube 1202. The outer perimeter of the wide section 1218 of the diverter structure 1204 may not be in direct contact with the combustion tube 1202, which may be a cylindrical tube as shown in FIG. 12. For example, the outer perimeter of the wide section 1218 may be spaced from the combustion tube 1202 by ⅛ inch.

In some example embodiments, when the combustion tube assembly 1200 is installed in water heater, such as the water heater 100 of FIG. 1, the hot exhaust gas produced from the combustion of the water heater fuel in the combustion tube 1202 proximal to the open end 1212 flows down toward the closed end 1214. The flow direction of the hot exhaust gas in the combustion tube 1202 is shown by arrows 1226, where, for example, the blower of the combustion system 108 of the water heater 100 pushes the hot exhaust gas downwardly toward the closed end 1214.

As the hot exhaust gas flows down toward the closed end 1214, some of the hot exhaust gas is diverted by the wide section 1218 of the diverter structure 1204 toward the relatively narrow space through the narrow section 1216. The hot exhaust gas flows down through the space in the narrow section 1216 toward the closed end 1214 of the combustion tube 1202 on a first side of the diverter structure 1204 and passes to the annular space between the diverter structure 1204 and the combustion tube 1202 through flow openings 1222 proximal to the closed end 1214. For example, the flow openings 1222 may be bound by the narrow section 1216 and the cover structure 1210. The hot exhaust gas that passes to the second side of the diverter structure 1204 (i.e., to the annular space between the diverter structure 1204 and the combustion tube) flows back up on the second side of the diverter structure 1204 and exits the combustion tube 1204 through the outflow opening 1208 that is located below the wide section 1218. For example, the outflow opening 1208 may be located proximal to the slanted section 1218 and relatively distal from the closed end 1214.

The diversion of the hot exhaust gas by the diverter structure 1204 causes turbulence in the hot exhaust gas, which results in the disruption of the more laminar flow of the hot exhaust gas reaching the diverter structure 1204. The relatively narrow space through the narrow section 1216 also results in the hot exhaust gas flowing at a relatively faster velocity. The redirection of the hot exhaust gas to the relatively narrow annular space also increases the turbulence in the hot exhaust gas as the hot exhaust gas flows upward to the outflow opening 908 after passing through the flow openings 1222. The resulting turbulent flow of the hot exhaust gas caused by the diverter structure 604 1204 results in improved transfer of heat from the hot exhaust gas to the combustion tube 1202.

The combustion tube assembly 1200 results in a more efficient heating of the water contained in a water tank of a water heater, such as the water heater 100, compared to a combustion tube that does not have the diverter structure 1204 positioned therein. The disturbances of the hot exhaust gas as the hot exhaust gas is diverted to flow down on the first side of the diverter structure 1204 and back up on the second side of the diverter structure 1204 to reach the outflow opening 1208 result in an increased transfer of heat from the hot exhaust gas to the combustion tube 1202, thereby increasing the transfer of heat from the hot exhaust gas to the water in the water tank, such as the water tank 102, through the combustion tube 1202.

In some example embodiments, the combustion tube 1202 and the diverter structure 1204 may be made from a material that is suitable for use in a water heater as can be readily understood by those of ordinary skill in the art with the benefit of this disclosure. For example, the combustion tube may be made from steel. As another example, the diverter structure 1204 may be made from stainless steel or Inconel in a manner known by those of ordinary skill in the art with the benefit of this disclosure. In some example embodiments, the outflow opening 1208 may extend out less or may not extend out as shown in FIG. 12 and may, for example, be flush with the combustion tube 1202.

In some alternative embodiments, the diverter structure 1204 may be shorter or longer relative to the combustion tube 1202 than shown in FIG. 12. In some alternative embodiments, the wide section 1218 may be slanted at a smaller or larger angle than shown in FIG. 12 without departing from the scope of this disclosure. In some alternative embodiments, the wide section 1218 may be shorter or longer than shown in FIG. 12 without departing from the scope of this disclosure. In some alternative embodiments, the wide section 1218 may be narrower and the narrow section 1216 may be wider than shown in FIG. 12 without departing from the scope of this disclosure. In some alternative embodiments, the outflow opening 1208 may be at a different location than shown without departing from the scope of this disclosure.

In some alternative embodiments, the combustion tube 1202 and/or the diverter structure 1204 may have a different shape than shown without departing from the scope of this disclosure. In some example embodiments, the diverter structure 1204 may include other sections without departing from the scope of this disclosure. In some alternative embodiments, the flow opening 1222 may have a different shape and/or size than shown without departing from the scope of this disclosure. In some alternative embodiments, the flow opening 1222 may be at a higher location than shown without departing from the scope of this disclosure. For example, the flow opening 1222 may be formed entirely through the narrow section 1216.

Figure 13:
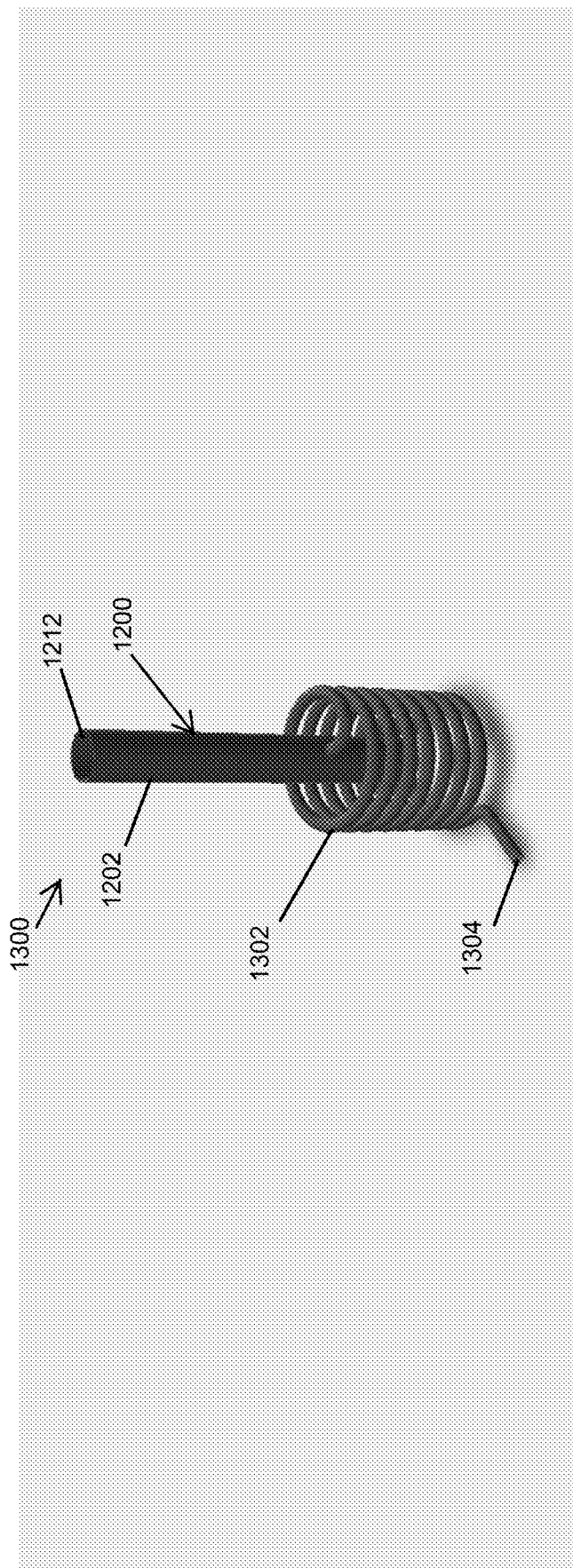
FIG. 13 illustrates a side view of a heat exchanger assembly including the combustion tube assembly of FIG. 12 according to an example embodiment.
Figure 14:
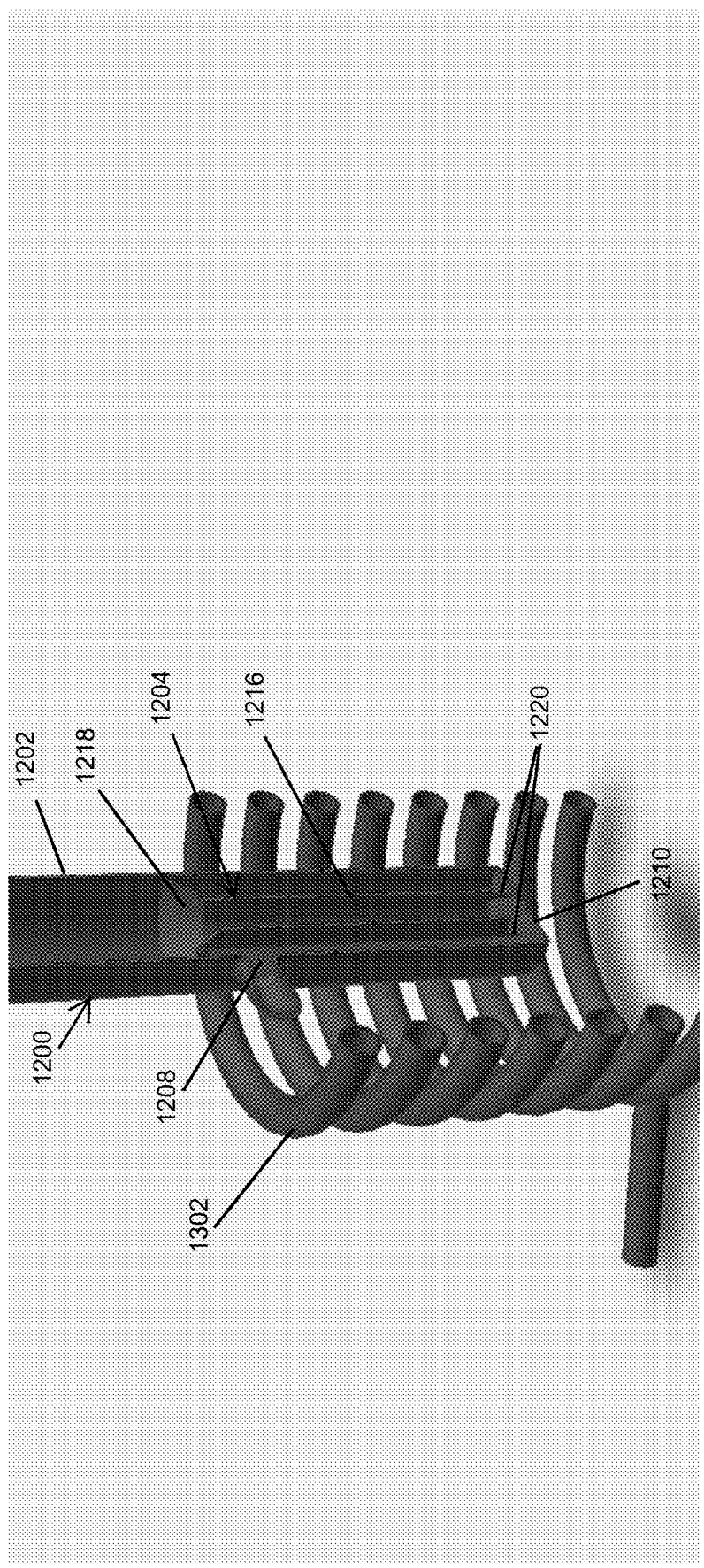
FIG. 14 illustrates a cross-sectional view of the heat exchanger assembly of FIG. 13 according to an example embodiment.

FIG. 13 illustrates a side view of a heat exchanger assembly 1300 including the combustion tube assembly 1200 of FIG. 12 according to an example embodiment. FIG. 14 illustrates a cross-sectional view of the heat exchanger assembly 1300 of FIG. 13 according to an example embodiment. Referring to FIGS. 1 and 12-14, the heat exchanger assembly 1300 of FIG. 13 may correspond to or may be used in place of the combustion tube assembly 110 and the heat exchanger 112 shown in FIG. 1.

In some example embodiments, the heat exchanger assembly 1300 includes the combustion tube assembly 1200 and the heat exchanger 1302. The heat exchanger 1302 is attached to the combustion tube 1202 at the outflow opening 1208 of the combustion tube 1202. For example, the heat exchanger 1302 may be welded or attached by other means as can be readily contemplated by those of ordinary skill in the art with the benefit of this disclosure.

In some example embodiments, when the heat exchanger assembly 1300 is installed in a water heater, such as the water heater 100, more heat is transferred from the hot exhaust gas to the water through the combustion tube 1202 compared to the amount of heat transferred to the water through a typical combustion tube that does not include the diverter structure 1204. The hot exhaust gas that flows in the combustion tube 1202 enters the heat exchanger 1302 from the combustion tube 1202 through the outflow opening 1208 after transferring some of its heat to the water through the combustion tube 1202. As described above, the diverter structure 1204 includes the narrow section 1216 and the wide section 1218 that divert and direct the hot exhaust gas to flow down through the diverter structure 1204 on one side of the wall section 1216 and back up on a second side of the diverter structure 1204 after flowing through the flow openings 1222, where the hot exhaust gas exits the combustion tube 1202 through the outflow opening 1208 on the second side of the diverter structure 1204.

The exhaust gas exiting the combustion tube 1202 enters the heat exchanger 1302 through the outflow opening 1208 and flows through the heat exchanger 1302. To illustrate, the heat exchanger 1302 may be a hollow coil that has an inflow opening that is aligned with the outflow opening 1208. The exhaust gas in the heat exchanger 1302 transfers heat to the water in the water tank through the heat exchanger 1302 as the exhaust gas flows through the heat exchanger 1302. The exhaust gas leaves the heat exchanger 1302 through an exhaust outlet 1304. Because the exhaust gas transfers heat to the water through the heat exchanger 1302 as it flows through the heat exchanger 1302, the exhaust gas has a lower temperature at the exhaust outlet 1304 than at the outflow opening 1208.

By increasing the transfer of heat through the combustion tube 1202 of the combustion tube assembly 1200, the overall heat transfer efficiency of the heat exchanger assembly 1300 is increased. The combustion tube assembly 1200 and the heat exchanger assembly 1300 allow more of the heat produced in the combustion tube 1202 to be utilized by a water heater such as the water heater 100.

In some example embodiments, the heat exchanger 1302 may be made from a suitable material as can be readily contemplated by those of ordinary skill in the art with the benefit of this disclosure. For example, the heat exchanger 1302 may be made from steel or another material using methods, such as bending, etc., known by those of ordinary skill in the art with the benefit of this disclosure.

In some alternative embodiments, the heat exchanger 1302 may have fewer windings than shown without departing from the scope of this disclosure. In some alternative embodiments, the heat exchanger 1302 may have a different shape than shown without departing from the scope of this disclosure. In some alternative embodiments, the heat exchanger 1302 may be attached to the combustion tube 1202 at a different location than shown without departing from the scope of this disclosure. In some alternative embodiments, the relative heights of the combustion tube 1202 and the heat exchanger 1302 may be different than shown without departing from the scope of this disclosure.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A combustion tube assembly of a water heater, the combustion tube assembly comprising:
   a combustion tube having an open end, a closed end, and an outflow opening located between the open end and the closed end, wherein a cavity of the combustion tube provides a chamber for a combustion of a water heater fuel that produces an exhaust gas that flows down toward the closed end; and
   a diverter structure positioned inside the combustion tube and including a first section having a first leg and a second leg affixed to the closed end, the first leg and the second leg forming a flow opening, the diverter structure configured to divert the exhaust gas such that the exhaust gas flows toward the closed end on a first side of the diverter structure and flows from the first side of the diverter structure to a second side of the diverter structure through the flow opening proximal to the closed end and wherein the outflow opening provides an outlet for the exhaust gas that flows to the second side of the diverter structure to exit the combustion tube.

2. The combustion tube assembly of claim 1, wherein the combustion tube is closed at the closed end by a cover structure that is attached to the combustion tube and wherein the first leg and the second leg are attached to the cover structure.

3. The combustion tube assembly of claim 2, wherein the flow opening is bound by the diverter structure and the cover structure.

4. The combustion tube assembly of claim 1, wherein the first section of the diverter structure is a wall section that extends down from an end of a slanted section of the diverter structure and wherein the slanted section is slanted down toward the wall section.

5. The combustion tube assembly of claim 4, wherein the outflow opening is located below and proximal to the slanted section and distal from the closed end.

6. The combustion tube assembly of claim 1, further comprising a separator structure positioned in the cavity, wherein the diverter structure and the separator structure provide a flow path on a first side of the separator structure for the exhaust gas that flows to the second side of the diverter structure to flow to a second side of the separator structure before exiting the combustion tube from the second side of the separator structure through the outflow opening.

7. The combustion tube assembly of claim 6, wherein the outflow opening is located below a slanted section of the diverter structure and proximal to the closed end.

8. The combustion tube assembly of claim 1, wherein the diverter structure further includes a wide section, the first section and the wide section defining a funnel shape.

9. The combustion tube assembly of claim 8, wherein the first side of the diverter structure is through the first section and wherein the first section and a portion of the combustion tube define an annular space that is on the second side of the diverter structure.

10. The combustion tube assembly of claim 9, wherein the outflow opening is located below and proximal to the wide section and distal from the closed end.

11. A heat exchanger assembly of a water heater, the heat exchanger assembly comprising:
    a combustion tube having an open end, a closed end, and an outflow opening located between the open end and the closed end, wherein a cavity of the combustion tube provides a chamber for a combustion of a water heater fuel that produces an exhaust gas that flows down toward the closed end;
    a diverter structure positioned inside the combustion tube and including a first section having a first leg and a second leg affixed to the closed end, the first leg and the second leg forming a flow opening, the diverter structure configured to divert the exhaust gas such that the exhaust gas flows toward the closed end on a first side of the diverter structure and such that the exhaust gas flows from the first side of the diverter structure to a second side of the diverter structure through the flow opening proximal to the closed end; and
    a hollow coil attached to the combustion tube, wherein the outflow opening provides an outlet for the exhaust gas that flows to the second side of the diverter structure to exit the combustion tube into the hollow coil.

12. The heat exchanger assembly of claim 11, wherein the combustion tube is closed at the closed end by a cover structure that is attached to the combustion tube and wherein the first leg and the second leg are attached to the cover structure.

13. The heat exchanger assembly of claim 11, wherein the first section of the diverter structure is a wall section that extends down from an end of a slanted section and wherein the slanted section is slanted down toward the wall section.

14. The heat exchanger assembly of claim 11, further comprising a separator structure positioned in the cavity, wherein the diverter structure and the separator structure provide a flow path on a first side of the separator structure for the exhaust gas that flows to the second side of the diverter structure to flow to a second side of the separator structure before exiting the combustion tube from the second side of the separator structure through the outflow opening.

15. The heat exchanger assembly of claim 11, wherein the diverter structure further includes a wide section, the first section and the wide section defining a funnel shape, wherein the first side of the diverter structure is through the first section, and wherein the first section and a portion of the combustion tube define an annular space that is on the second side of the diverter structure.

16. A water heater, comprising:
    a water tank;
    a combustion system positioned at a top end of the water heater; and
    a heat exchanger assembly positioned inside the water tank, the heat exchanger assembly comprising:
    a combustion tube having an open end, a closed end, and an outflow opening located between the open end and the closed end, wherein a cavity of the combustion tube provides a chamber for a combustion of a water heater fuel that produces an exhaust gas that flows down toward the closed end; and
    a diverter structure positioned inside the combustion tube and including a first section having one or more legs affixed to the closed end to form a flow opening and a wide section, the first section and the wide section defining a funnel shape, the diverter structure configured to divert the exhaust gas such that the exhaust gas flows toward the closed end on a first side of the diverter structure, the first side being through the first section, and such that the exhaust gas flows from the first side of the diverter structure to a second side of the diverter structure through the flow opening proximal to the closed end, the second side being an annular space between the first section and a portion of the combustion tube; and a hollow coil attached to the combustion tube, wherein the outflow opening provides an outlet for the exhaust gas that flows to the second side of the diverter structure to exit the combustion tube into the hollow coil.

17. The water heater of claim 16, wherein the combustion tube is closed at the closed end by a cover structure that is attached to the combustion tube and wherein the one or more legs is attached to the cover structure.

\* \* \* \* \*